United States Patent
Martin et al.

(10) Patent No.: US 7,962,672 B1
(45) Date of Patent: Jun. 14, 2011

(54) TECHNIQUES FOR DATA STORAGE CONFIGURATION

(75) Inventors: Kevin Martin, Dracut, MA (US); Michael J. Scharland, Franklin, MA (US); Patrick Brian Riordan, Newton, MA (US); Arieh Don, Newton, MA (US); Violet S. Beckett, Sutton, MA (US); John F. Madden, Jr., Holden, MA (US)

(73) Assignee: EMC Corporation, Hopkinton, MA (US)

( * ) Notice: Subject to any disclaimer, the term of this patent is extended or adjusted under 35 U.S.C. 154(b) by 115 days.

(21) Appl. No.: 12/586,765

(22) Filed: Sep. 28, 2009

(51) Int. Cl.
*G06F 3/00* (2006.01)
(52) U.S. Cl. .......................... 710/38; 340/2.1
(58) Field of Classification Search .................. None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,502,898 B2 | 3/2009 | Blumeneau et al. | |
| 2004/0225764 A1* | 11/2004 | Pooni et al. | 710/38 |
| 2005/0234941 A1* | 10/2005 | Watanabe | 707/100 |
| 2007/0079097 A1* | 4/2007 | Karnowski et al. | 711/170 |
| 2009/0150638 A1* | 6/2009 | Kawasaki | 711/170 |

OTHER PUBLICATIONS

U.S. Appl. No. 12/317,158, filed Dec. 19, 2008, Rowlands et al.

* cited by examiner

*Primary Examiner* — Henry W Tsai
*Assistant Examiner* — Elias Mamo
(74) *Attorney, Agent, or Firm* — Muirhead and Saturnelli, LLC

(57) ABSTRACT

Described are techniques for storage configuration. Defined are one or more initiator groups each including one or more initiator ports, one or more target groups each including one or more target ports, and one or more storage groups each including one or more devices. A masking view is created where the masking view includes a first of the initiator groups, a first of the target groups, and a first of the storage groups. The masking view indicates which devices of the first storage group are accessible using one or more paths. Each of the one or more paths is specified using an initiator port from the first initiator group and a target port from the first target group.

19 Claims, 20 Drawing Sheets

SG4 = 5 logical devices denoted B1-B5

| Path | LUN info |
|---|---|
| HBA5-FA1 | B1 = LUN0<br>B2 = LUN1<br>B3 = LUN2<br>B4 = LUN3<br>B5 = LUN4 |
| HBA5-FA2 | B1 = LUN0<br>B2 = LUN1<br>B3 = LUN2<br>B4 = LUN3<br>B5 = LUN4 |
| HBA6-FA1 | B1 = LUN0<br>B2 = LUN1<br>B3 = LUN2<br>B4 = LUN3<br>B5 = LUN4 |
| HBA6-FA2 | B1 = LUN0<br>B2 = LUN1<br>B3 = LUN2<br>B4 = LUN3<br>B5 = LUN4 |

TECHNIQUES FOR DATA STORAGE CONFIGURATION

BACKGROUND

1. Technical Field

This application generally relates to data storage, and more particularly to techniques used in connection with data storage configuration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

In order for a host to access and use one or more logical devices of a data storage system, a user or customer performs processing in connection with configuration. The customer configures which logical devices are accessible to a host through a selected initiator port on the host and a selected target port of the data storage system. The foregoing may be used to define a path, as identified by the initiator port and target port, over which the logical device may be accessed by the host. Using one existing technique, the customer may manually define a combination of initiator port, target port and logical device for each particular logical device to be accessed or be visible from the host. Performing the foregoing to access each such logical device may be a time consuming and complex task especially as the complexity of a system increases with respect to one or more aspects such as, for example, as the number of data storage systems increases, the number of target ports and/or logical devices of each data storage system increases, and the like.

SUMMARY OF THE INVENTION

In accordance with one aspect of the invention is a computer implemented method for storage configuration. One or more initiator groups are defined and each of the initiator group groups includes one or more initiator ports. One or more target groups are defined and each of the target groups includes one or more target ports. One or more storage groups are defined and each storage group includes one or more devices. A masking view is created. The masking view includes a first initiator group from said one or more initiator groups, a first target group from said one or more target groups, and a first storage group from said one or more storage groups. The masking view indicates which devices of said first storage group are accessible using one or more paths, each of said one or more paths specified using an initiator port from said first initiator group and a target port from said first target group. The initiator ports may be included in a host. The target ports may be included in a data storage system including a default masking view and where the masking view is a first masking view defined when bootstrapping the data storage system. In response to creating the masking view, the default masking view is deleted. The method may also include updating the masking view; receiving a command from the host directed to a target port of the masking view; and in response to said receiving and said updating, the data storage system fails the command and notifies said host of the command failure and that there has been a change to the masking view. The devices may include one or more logical devices of the data storage system. The method may also includes performing automated logical Unit assignment for each device of said first storage group where said each device is added as a device accessible over a selected path included in said one or more paths associated with said masking view, said device being added if said device is not already specified as a device accessible over the selected path prior to creating said masking view, each device that is added for the selected path being assigned a next logical unit identifier in a sequence uniquely associated with the selected path. A different logical unit assignment sequence may be associated with each path included in said one or more paths. At least one of said first initiator group, said first target group and said first storage group may have at least one member which is another group. At least one of said first initiator group, said first target group and said first storage group may be specified using a hierarchical structure group definition, said hierarchical structure group definition including at least member which is a group. The method may also include modifying said masking view by modifying at least one of said first initiator group, said first port group, and said first storage group; and automatically performing said automated logical unit assignment for each device of said first storage group where said each device is added as a device accessible over a selected path included in said one or more paths associated with said masking view, said device being added if said device is not already specified as a device accessible over the selected path prior to performing said modifying of said masking view. Automated logical unit assignment may be performed for each device included in said first storage group, a different logical unit sequence being associated with each different path over which devices are accessible so that if a same logical device is accessible on two different paths, said same logical device may be assigned a first logical unit identifier on a first of said two different paths in accordance with a next identifier of a first identifier sequence for the first path and a second logical unit identifier on a second of said two different paths in accordance with a next identifier of a second identifier sequence for the second path. At least one port included in said first initiator group or said first target group may be a virtual port. The first storage group may include devices used by a first application and said one or more storage groups may include a second storage group comprising devices used by a second application. The first storage group may include devices having a first set of one or more attributes common to devices of the first storage group, and said one or more storage groups may include a second storage group comprising devices having a second set of one or more attributes common to devices of the second storage group. The one or more devices may be logical devices of a data storage system. The method may also include creating a second masking view different from said masking view, said second masking view being defined using at least one of said first initiator group, said first target group and said first storage group.

In accordance with another aspect of the invention is a computer readable medium comprising executable code stored thereon which, when executed, perform processing for storage configuration. The computer readable medium comprises executable code for defining one or more initiator groups each including one or more initiator ports, defining one or more target groups each including one or more target ports, defining one or more storage groups each including one or more devices; and creating a masking view including a first initiator group from said one or more initiator groups, a first target group from said one or more target groups, and a first storage group from said one or more storage groups. The masking view may indicate which devices of said first storage group are accessible using one or more paths, each of said one or more paths specified using an initiator port from said first initiator group and a target port from said first target group. The initiator ports may be included in a host. The target ports may be included in a data storage system. The devices may include one or more logical devices of the data storage system. The computer readable medium may further comprise executable code for performing automated logical unit assignment for each device of said first storage group where said each device is added as a device accessible over a selected path included in said one or more paths associated with said masking view, said device being added if said device is not already specified as a device accessible over the selected path prior to creating said masking view, each device that is added for the selected path being assigned a next logical unit identifier in a sequence uniquely associated with the selected path, and wherein a different logical unit assignment sequence is associated with each path included in said one or more paths. At least one of said first initiator group, said first target group and said first storage group may have at least one member which is another group, said at least one of said groups having a hierarchical structure group definition.

In accordance with another aspect of the invention is a system comprising: a data storage system including one or more initiator ports and one or more storage devices; a host including one or more target ports; and a computer readable medium. The computer readable medium comprises executable code stored thereon which, when executed, perform processing for storage configuration. The computer readable medium comprises executable code for defining one or more initiator groups each including at least one of said one or more initiator ports; defining one or more target groups each including at least one of said one or more target ports; defining one or more storage groups each including at least one of said one or more devices; and creating a masking view including a first initiator group from said one or more initiator groups, a first target group from said one or more target groups, and a first storage group from said one or more storage groups, said masking view indicating which devices of said first storage group are accessible using one or more paths, each of said one or more paths specified using an initiator port from said first initiator group and a target port from said first target group.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5-16 are examples illustrating various aspects resulting from performing processing steps in connection with the techniques herein.

DETAILED DESCRIPTION OF EMBODIMENT(S)

Figure 1:
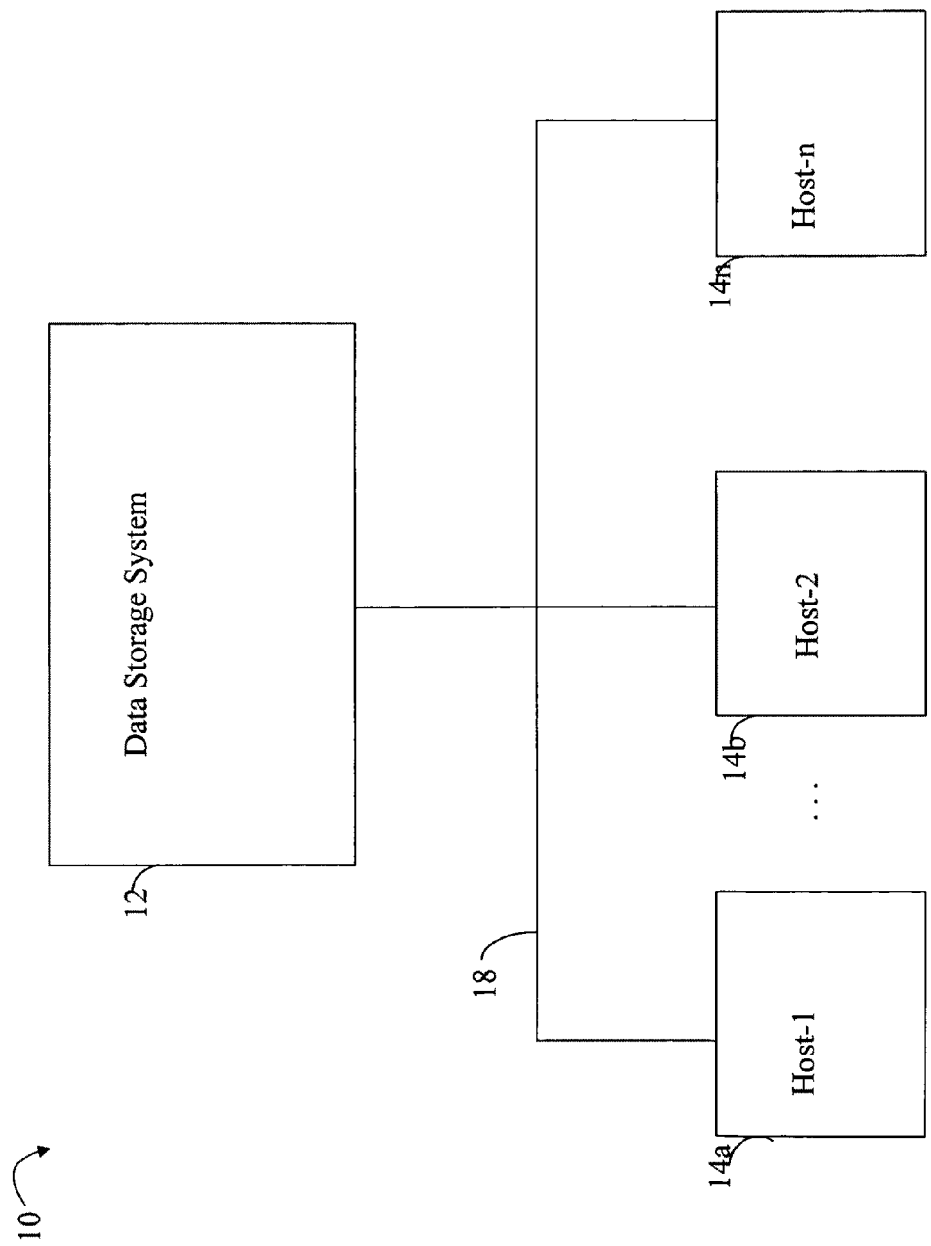
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
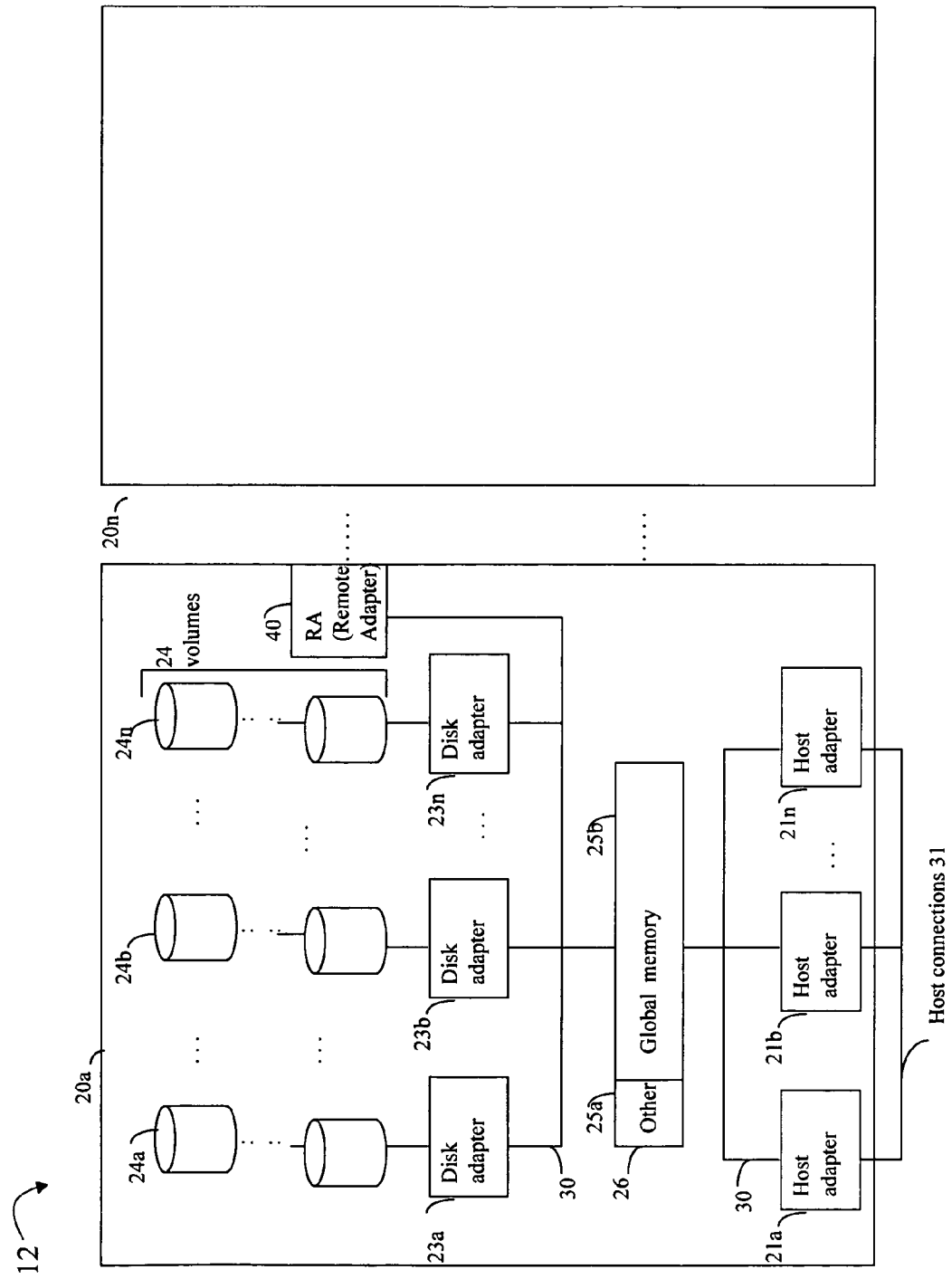
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein.

One or more internal logical communication paths may exist between the DA's, the RA's, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices (LDs) or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
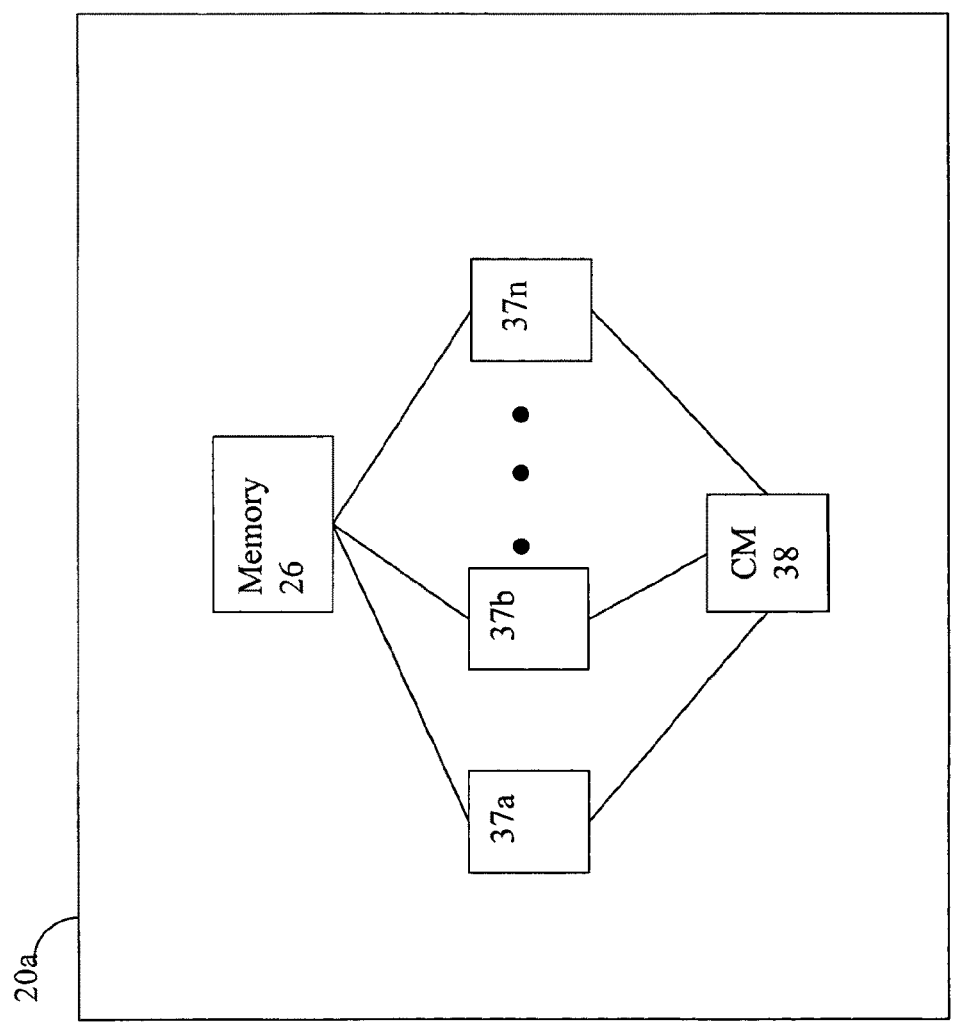
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In order for a host to access and use one or more logical devices of a data storage system, a user or customer performs processing in connection with configuration. The customer configures which logical devices are accessible to a host through a selected initiator port on the host and a selected target port of the data storage system. An initiator port may be a port of a host bus adapter or HBA of the host. A target port may be a port of an FC of the data storage system. From the hosts' point of view (or point of view of the application executing on the host), the following may be used in sending a command from the host directed to a logical device of a data storage system: an initiator port, a target port and a LUN or logical unit number. A LUN may be characterized as an identifier used to specify a particular logical device of the data storage system, such as in connection with an application executing on the host when the application sends a SCSI command to the data storage system. In accordance with the different protocols of the different communications layers (such as of the OSI model or architecture), the LUN may be utilized by the SCSI protocol (such as of the physical layer) and the target and initiator port may be used by the FC protocol (such as of the transport layer).

Using one existing technique, the customer may define a combination of initiator port, target port and logical device for each particular logical device to be accessed or be visible from the host. The foregoing may be used to define a path, as identified by the initiator port and target port, over which the logical device may be accessed by the host. Performing the foregoing to access each such logical device may be a time consuming and complex task especially as the complexity of a system increases with respect to one or more aspects such as, for example, as the number of data storage systems increases, the number of target ports and/or logical devices of each data storage system increases, and the like.

As such, described in following paragraphs are techniques that may be used in connection with performing the foregoing configuration of one or more paths over which a logical device may be accessed by the host such as, for example, when an application of the host issues a command to be executed with respect to the logical device of a data storage system. By performing the foregoing configuration, the customer controls which logical devices are accessible or visible to a host. Furthermore, the customer controls over which one or more paths a selected logical device may be accessed. As described herein, a path may be identified by a unique combination or pairing of initiator port and target port. If one or both of the initiator port and/or target port is different, a different path is identified.

In connection with the techniques herein, an embodiment may utilize and provide functionality for three types of groups: an initiator port group (IG), a target port group (PG), and a storage group (SG). The existing group definitions for each of the foregoing three types of groups may be stored on a form of computer readable storage medium on the data storage system. A PG is a target port group including one or more FA ports of a data storage system. As an example, a customer may create a PG of one or more FA ports for each application executing on a host where the PG indicates what selected FA ports the customer wants the application to use as targets on the data storage system. It should be noted that the number of ports per FA may vary with hardware. An embodiment in accordance with techniques herein may have one or more ports per FA. If an embodiment has multiple ports per FA, the customer may perform the configuration by specifying sufficient information to identify which one or more ports of the FA are included in the PG. (e.g., specify FA1, port0; FA1, port 1, and the like, if there are 2 ports/FA). An SG is a set of one or more logical devices or array logical devices.

An IG is a set of one or more initiator ports. Each initiator port is a port of a host bus adapter or HBA of a host. As with FA ports of PGs, an HBA may have one or more initiator ports depending on the particular hardware. An embodiment in accordance with techniques herein may have one or more ports per HBA. If an embodiment has multiple ports per HBA, the customer may perform the configuration by specifying sufficient information to identify which one or more ports of the HBA are included in the PG. Each of the foregoing 3 types of groups may have its own unique name space. Within each type of group (e.g., IG, SG, PG), each different group instance or definition may have a unique name or other unique identifier in order to distinguish, for example, a first IG from a second different IG.

A user defines or creates a masking view by selecting a particular combination of IG, PG and SG. The masking view may be characterized as providing a view to the host of one or more logical devices of a data storage system where the view identifies how each such logical device may be accessed by the host over a path and where the path is identified by an initiator port of the host and a target port of the data storage system. More generally, the host may be characterized as one particular initiator issuing commands to the data storage system and accessing devices thereof. As an example, a user may define a masking view for each application or type of application executing on a host. One or more of the different types of group definitions may be used in defining masking views for different applications. For example, suppose it is desired to use a same set of target ports for both a first database application and a second application but also use a different set of initiator ports and a different set of logical devices for each application. A first masking view may be defined for the first application using a first PG, a first IG, and a first SG. A second masking group may be defined for the second application using the same first PG and a second different IG and a second different SG. Thus, in accordance with techniques described in more detail in following paragraphs, any single group definition may be used in connection with creating one or more different masking views.

An embodiment in accordance with techniques described herein may also allow cascading, nesting or hierarchical group definition structures where a member of a group may be another group. The foregoing may apply to each of the three different types of groups (e.g., IG, PG, SG). An embodiment in accordance with techniques herein may also provide for automatic generation and assignment of logical unit identifiers, such as LUNs, which are used by the host to identify a particular logical device of the data storage system. In accordance with techniques herein, an embodiment may provide for such automated LUN assignment on a per path basis where each path is identified by a unique pairing of initiator port and target port. As such, each path may be characterized as having its own logical unit identification sequence or LUN assignment sequence. A host may, for example, reference a same logical device using different LUNs where each of the different LUNs may be referenced by the host when accessing the same logical device over a different path.

Figure 3:
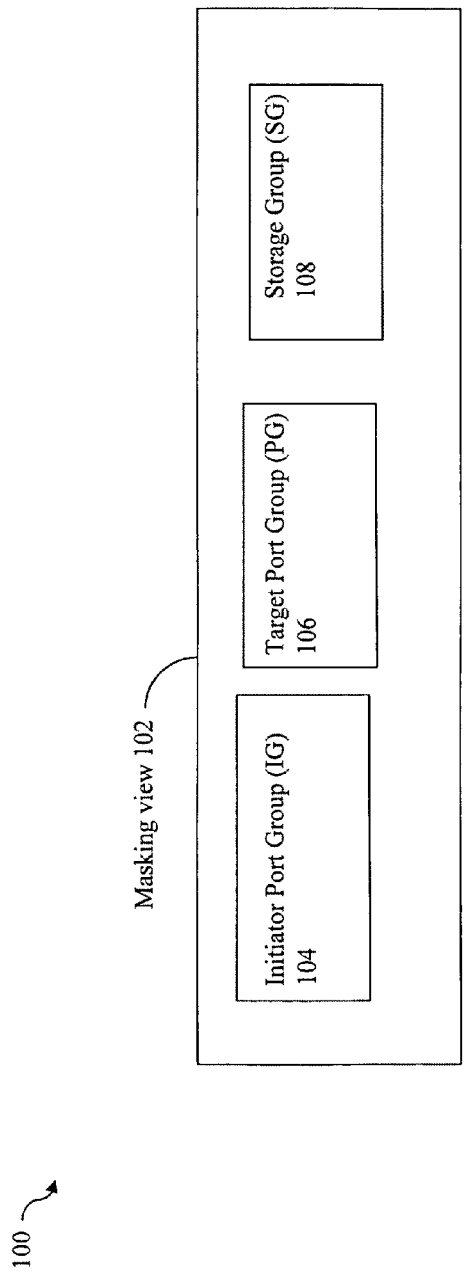
FIG. 3 is an example representation of a masking view in accordance with techniques herein.

Referring to FIG. 3, shown is an example illustrating a representation of a masking view. The masking view 102 may include an IG 104, PG 106, and SG 108. As described above, a user may first define each of the IG 104, PG 106, and SG 108. The foregoing groups may be defined, for example, using software which provides for naming each group and identifying members of each group. The group definitions may be stored on the data storage system. Subsequently, the user may create a masking view by associating references identifying each of the previous three group definitions. As will be described in more detail elsewhere herein, automatic LUN assignment may be performed for each path when a masking view is defined or otherwise modified, such as by modification of a group (e.g., add a member to a group) referenced in the masking view.

Figure 4:
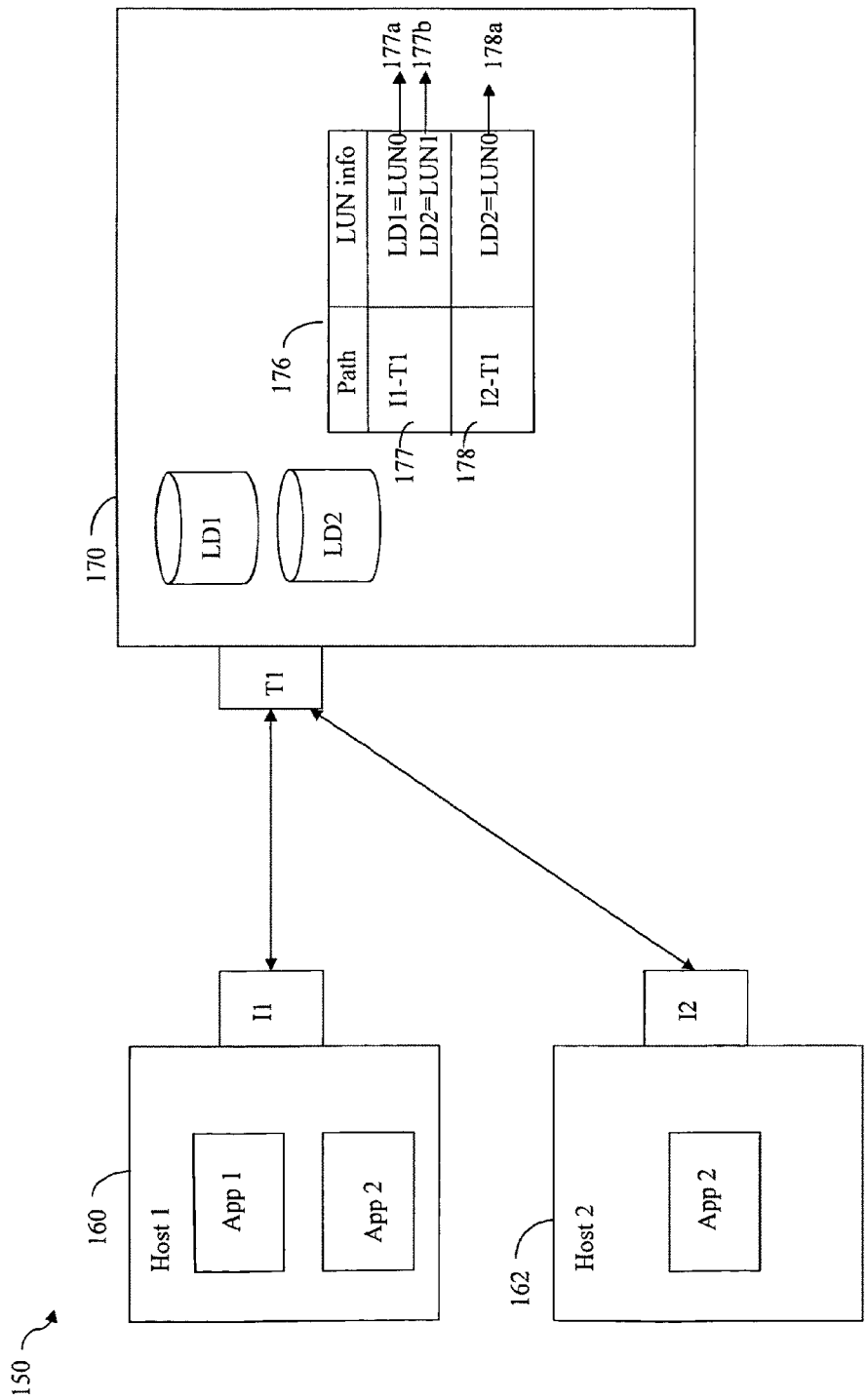
FIG. 4 is an example illustrating path specification and automated LUN assignment in accordance with techniques herein.

Referring to FIG. 4, shown is an example illustrating automatic LUN assignment in accordance with techniques herein. The example 150 includes a host 160, a host 162, and data storage system (such as a data storage array) 170. The host 160 includes an instance of a first application (app1), an instance of a second different application (app2), and a single initiator port I1. The host 162 includes an instance of the second application and a single initiator port I2. The data storage system 170 includes two logical devices LD1 and LD2 where each instance of app1 uses LD1 and each instance of app2 uses LD2. The system 170 also includes a single target port T1. In connection with examples herein it should be noted that the following conventions may be used: IGn for a named initiator port group, PGn for a named target port group, and SGn for a named storage group of logical devices. In connection with the example 150, assume that the following groups are defined:

PG1=T1; IG1=I1; IG2=I2; SG1=LD1; SG2=LD2.

and the following masking views are defined:

"View1" for App1 on host 160=(IG1, PG1, SG1)
"View2" for App2 on host 160=(IG1, PG1, SG2)
"View3" for App1 on host 162=(IG2, PG1, SG1).

In connection with the foregoing, there are two unique paths: I1-T1 and I2-T2, where each path is identified by unique pairing of initiator port and target port. The table 176 may represent the LUN information that may be stored in the data storage system 170 for each unique path. The table 176 may be updated as a result of LUN assignment as when masking views are created or modified. For purposes of this example, assume the views are created in the following order: View1, View 2, View3.

When View1 is created, each new path specified by the masking view may be identified and added to the table 176. For each new or existing path, processing is performed to see if View1 provides for any new or additional logical device availability. In other words, for each path, a determination is made as to whether the view results in another additional logical device being accessible on the path which, prior to creation of the view, the additional logical device was not available on the path. For each such logical device on a path, automated LUN assignment processing is performed where a next LUN from the LUN sequence for that particular path is associated with the logical device. To illustrate with respect to View1, a single new path I1-T1 is specified and added to table 176. View1 only specifies this single path. For the path I1-T1, LD1 is accessible. Prior to creating of View1, LD1 was not available on this path so automated LUN assignment processing is performed resulting in update of the LUN info of entry 177. In particular, the LUN info associated with 177a is added to the table 176 as a result of creating View1. In this example, each unique path (each unique combination of initiator port and target port) has a LUN sequence defined as the series of positive integers starting at 0 and LD1 may be referenced by App1 and host 1 over path I1-T1 using LUN0 (logical unit 0).

In a manner similar to that as described with reference to View1, View2 is then created. With respect to View2, no new paths are added to the table 176. Prior to creating of View2, LD2 was not available on the existing path I1-T1 so automated LUN assignment processing is performed resulting in update of the LUN info of entry 177. In particular, the LUN info associated with 177b is added to the table 176 as a result of creating View2. In this case, the next LUN in the LUN sequence associated with the path I1-T1 for entry 177 is assigned to LD2 so that LD2 may be referenced by App2 and host 1 over path I1-T1 using LUN1 (logical unit 1). The next view creation or modification result in an additional new device being available on path I1-T1 may be associated with a next number in the LUN sequence associated with this path.

In a manner similar to that as described with reference to View1, View3 is then created. With respect to View3, a new path I2-T1 is added to the table 176 result in creation of entry 178. Prior to creating of View3, LD2 was not available on the existing path I2-T1 so automated LUN assignment processing is performed resulting in update of the LUN info of entry 178. In particular, the LUN info associated with 178a is added to the table 176 as a result of creating View3. In this case, the next LUN in the LUN sequence associated with the path I2-T1 for entry 178 is assigned to LD2 so that LD2 may be referenced by App2 and host 2 over path I2-T1 using LUN0 (logical unit 0). The next view creation or modification result in an additional new device being available on path I2-T1 may be associated with a next number in the LUN sequence associated with this path.

It should be noted that in the example 150, a same logical device, LD2, may be referenced using two different LUNs on two different corresponding paths. Thus, the LUN-LD binding may be characterized as performed on a per path basis and at the path level.

In connection with the foregoing example and other described herein, information (such as included in table 176) is illustrative of the information that may be stored on the data storage system or elsewhere in any one of a variety of different forms and data structures. The particular representation described herein should not be construed as a limiting example of any particular structure or organization of data used in connection with techniques herein. With reference to the example 150, the table 176 is illustrative that an embodiment may track LUN information for each unique path in order to determine LUN-logical device associations and also what is the next available LUN in the LUN assignment sequence for each unique path.

What will now be described is a more detailed example illustrating the techniques herein. In the following example, storage may be assigned or configured for a database application on a new production database cluster. Multiple storage paths between the cluster and the data storage system may be required for each logical storage device available to the database application. Multiple paths between a backup server and the data storage system may also be required for local replication.

Figure 5:
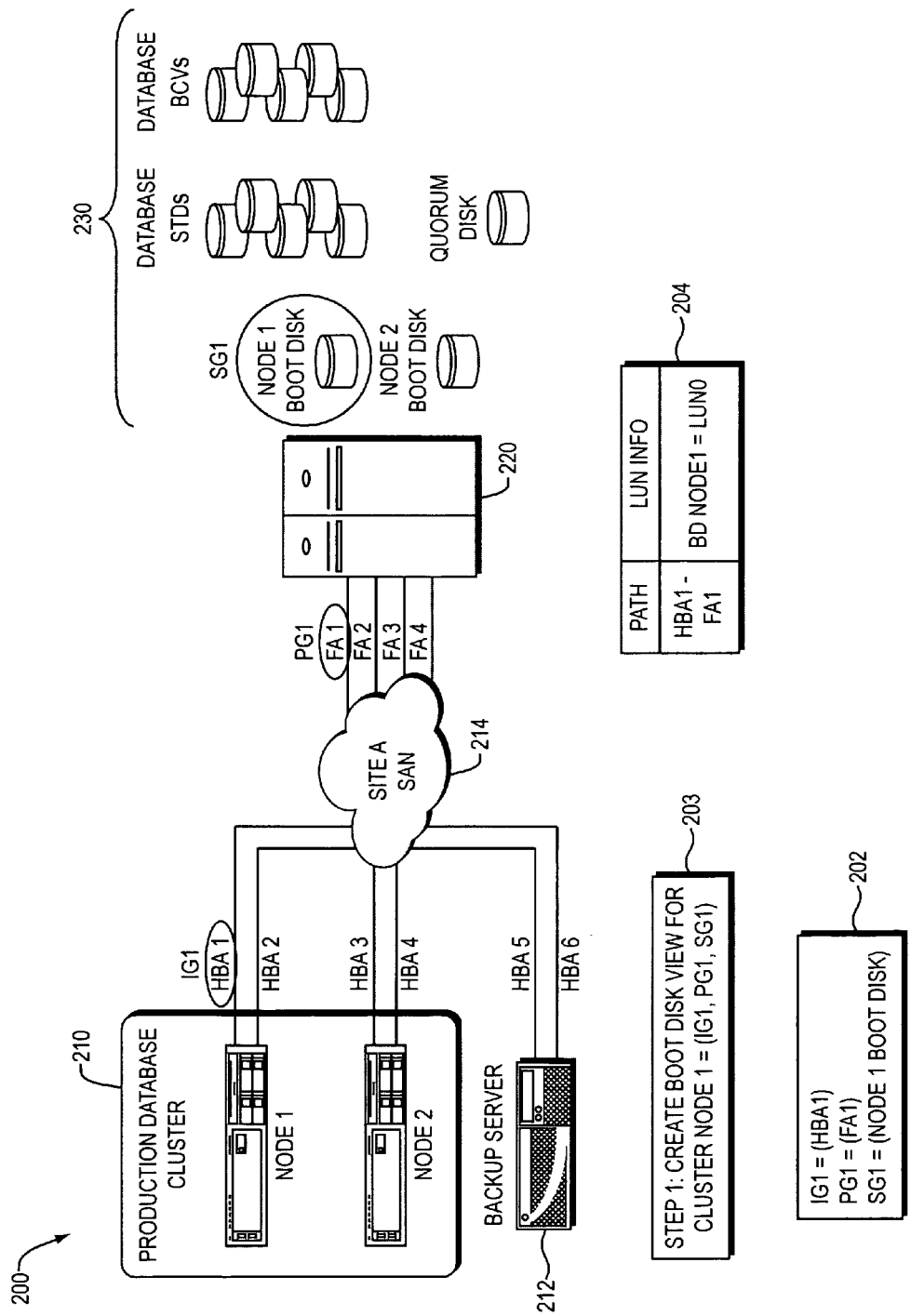

Referring to FIG. 5, shown is an example of a system and network for the above-referenced use case of the techniques herein. The example 200 illustrates a database cluster 210 including two hosts node 1 and node 2 where an instance of the database application may execute on each of the foregoing two hosts. The example 200 also includes a backup server 212 and a SAN 214 including data storage system 220. Element 230 illustrates the storage device of the data storage system 220 as may be used in connection with the techniques herein. The example 200 denotes a first step of a multiple step process in accordance with techniques herein to provide appropriate data storage system views to the nodes of the cluster 210 and the server 212. Element 230 denotes data storage used for node1's boot disk, node 2's boot disk, the database application (database STDs) and backup or local replication (database BCVs which contain a snapshot of data form the database STDs representing a backup of the data for the database applications at a point in time). Each boot disk is used to boot a different node or host of the cluster 210 and may therefore be unique per host and not typically shared among multiple hosts. Element 230 also includes a quorum disk which may be characterized as a common device used by each node in the cluster 210. Based on the foregoing, the following describes the data storage system device access and configuration or views desired which will be completed by the processing steps illustrated in FIG. 5 and subsequent figures in accordance with techniques herein:

1. Both node 1 and node 2 of 210 have access to the quorum disk of 230 and the database STDs.

2. Each node of the cluster has access to its own boot disk which is not used by any other node in the cluster 210 (e.g., node 1 of 210 has access to node 1 boot disk of 230 and node 2 of 210 has access to node 2 boot disk of 230).

3. The backup server 212 has access to the database BCVs of 230.

In the example 200, step 1 is illustrated in which a first boot disk (BD) masking view is created for cluster node 1 where the foregoing masking view may be represented by IG1, PG1 and SG1. Prior to creating the view, each of the foregoing groups IG1, PG1 and SG1 may be defined as illustrated by element 202 of FIG. 5 and as also illustrated in the system diagram and components of the example 200. Based on the group definitions of 202, the first BD masking view may then be created as represented in 203. As a result of creating the first BD masking view in step 1, the information of table 204 may be generated and stored on the data storage system 220. It should be noted that the group definitions as represented in 202 may also be stored on the data storage system 220.

In the example 200, each port of an HBA of a host (e.g., wherein node 1, node 2 and the backup server may each be a host) that may be included in an initiator port group (IG) is specified as HBAn, n=1, 2, . . . , to uniquely identify each such initiator port. Each port of an FA of the data storage system 220 that may be included in a target port group (PG) is specified as Fan, n=1, 2, 3, . . . to uniquely identify each such target port.

As part of step 1, the group definitions defined are those used in representing the logical device and access thereto for node 1 of the cluster for its boot device. In connection with creating the first BD masking view in step 1 so that node 1 can access its boot device (SG1), a single new path HBA1-FA1 is identified over which a single logical device, node 1 boot disk, is accessible. Thus, node 1's boot disk (BD Node 1) is assigned LUN0 as a result of automated LUN assignment processing.

It should be noted that the Symmetrix V-MAX Series Storage System by EMC Corporation is one type of data storage array that may be used as a data storage system with the techniques herein.

Figure 6:
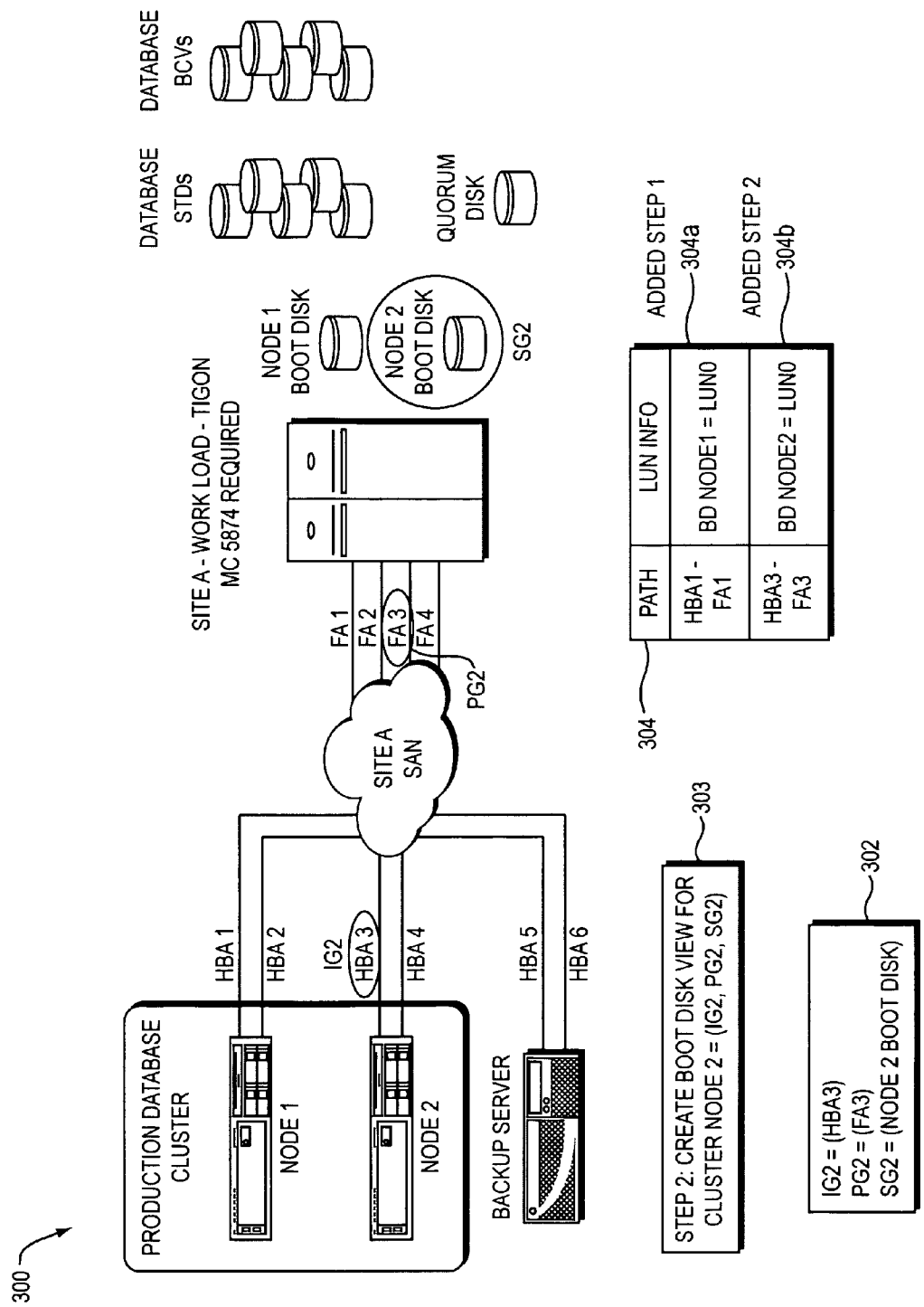

Referring to FIG. 6, illustrated is a second processing step in which a second BD masking view is created for cluster node 2. The foregoing second BD masking view may be represented by IG2, PG2 and SG2. Prior to creating the view, each of the foregoing groups IG2, PG2 and SG2 may be defined as illustrated by element 302 of FIG. 6 and as also illustrated in the system diagram and components of the example 300. Based on the group definitions of 302, the second BD masking view may then be created as represented in 303. As a result of creating the second BD masking view in step 2, the information of table 304 may be updated (as denoted by 304b). It should be noted that the group definitions as represented in 302 may also be stored on the data storage system in addition to other previously described group definitions of FIG. 5.

As part of step 2, the group definitions defined are those used in representing the logical device and access thereto for node 2 of the production database cluster for its boot device. In connection with creating the second BD masking view in step 2 so that node 2 can access its boot device (SG2), a single new path HBA3-FA3 (denoted by entry 304b) is identified over which a single logical device, node 2 boot disk (SG2), is accessible. Thus, as indicated by 304b, node 2's boot disk is assigned LUN0 as a result of automated LUN assignment processing.

Figure 7:
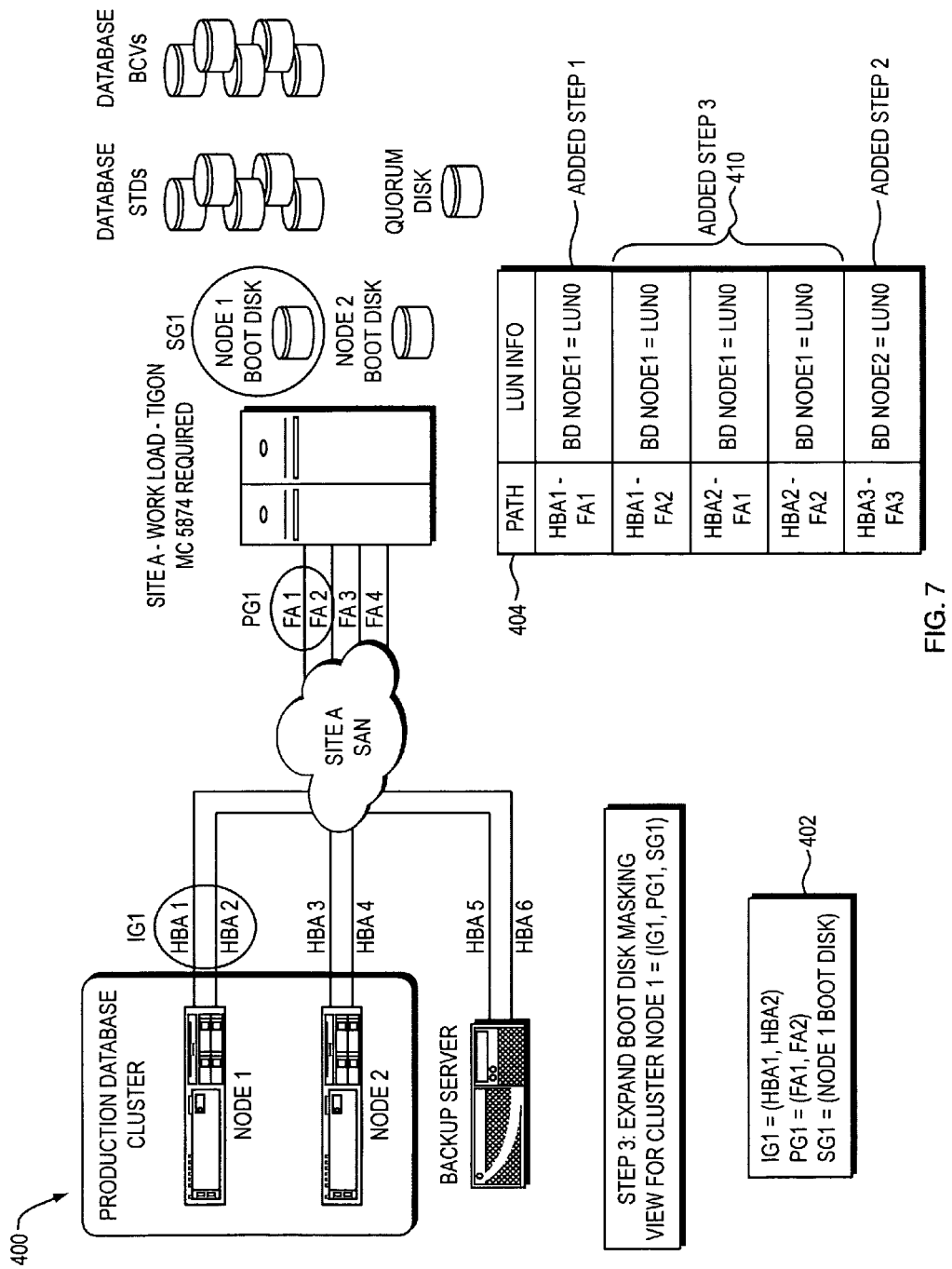

Referring to FIG. 7, illustrated is a third processing step in which the first BD masking view is modified causing expansion of the masking view. As described above, the foregoing first BD masking view may be represented by IG1, PG1 and SG1. The view modification may be the result of modifying IG1 and PG1 where the modifications are adding HBA2 to IG1 and adding FA2 to PG1. The modified groups may be defined as illustrated by element 402 of FIG. 7 and as also illustrated in the system diagram and components of the example 400. Based on the expanded group definitions of 402, the first BD masking view is expanded. As a result of expanding the first BD masking view in step 3, the information of table 404 may be updated.

As part of step 3, the group definitions used in representing the logical device and access thereto for node 1 of the production database cluster for its boot device (as initially created in step 1 of FIG. 5) are expanded. In connection with expanding the first BD masking view in step 3, three new paths (HBA1-FA2, HBA2-FA and HBA2-FA2) are identified over which a single logical device, node 1 boot disk (SG1), is accessible. Thus, as indicated by 410, node 1's boot disk is assigned LUN0 on each of the foregoing three new paths as a result of automated LUN assignment processing.

Figure 8A:
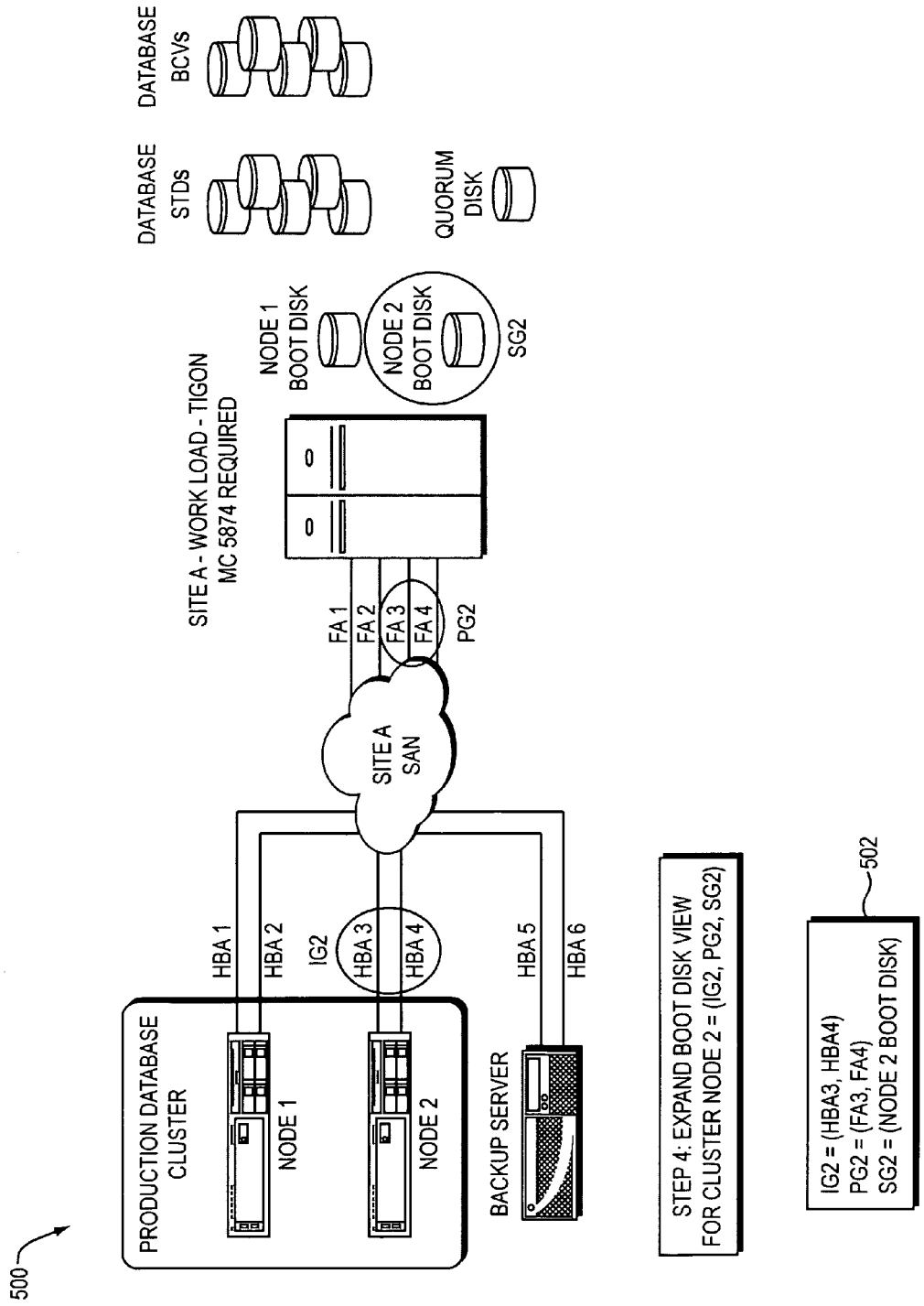
Figure 8B:
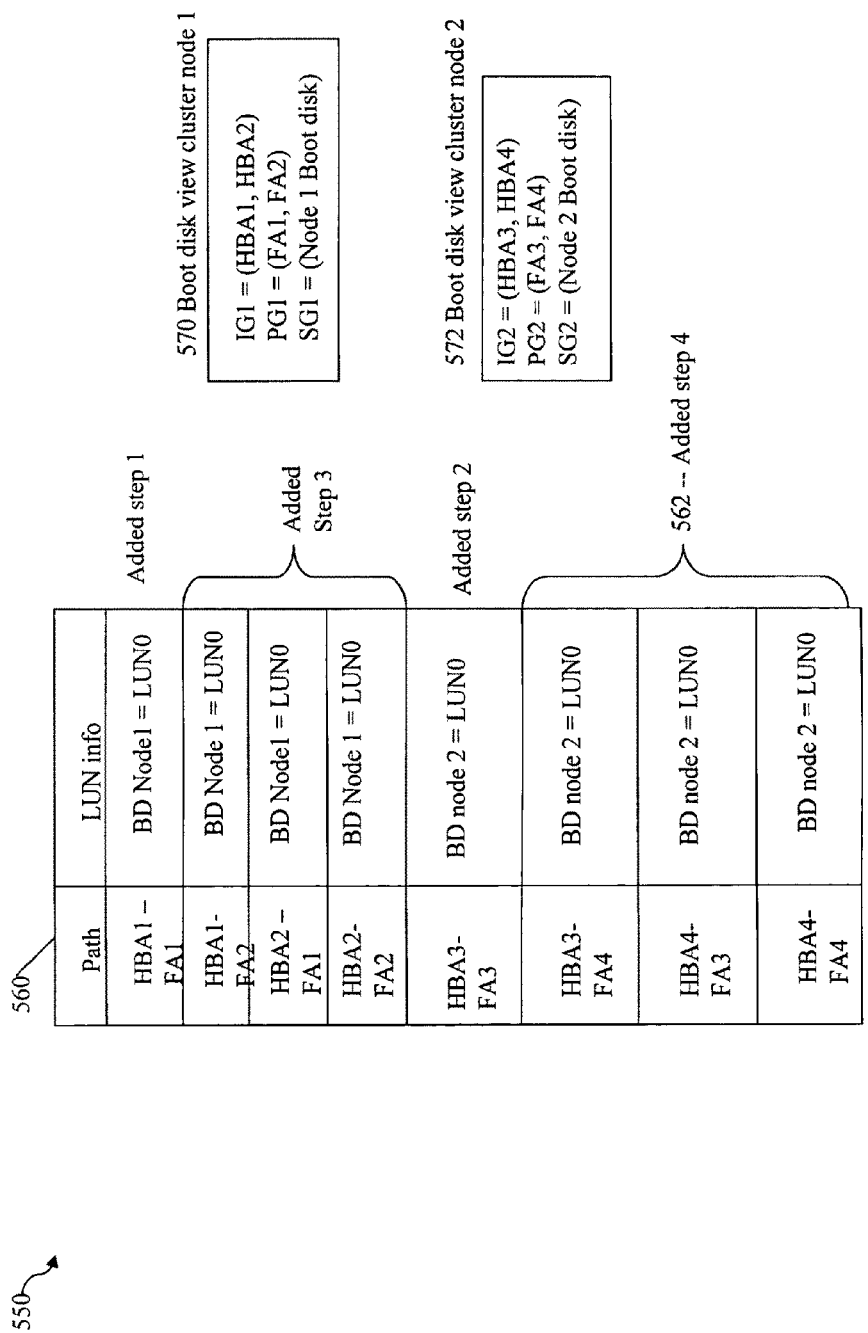

Referring to FIG. 8A, illustrated is a fourth processing step in which the second BD masking view is modified causing expansion of the masking view. The foregoing second BD masking view may be represented by IG2, PG2 and SG2. The view modification may be the result of modifying IG2 and PG2 by adding HBA4 to IG2 and adding FA4 to PG2. The modified groups may be defined as illustrated by element 502 of FIG. 8A and as also illustrated in the system diagram and components of the example 500. Based on the expanded group definitions of 502, the second BD masking view is expanded. As a result of expanding the second BD masking view in step 4, the information of table 560 of FIG. 8B may be updated.

As part of step 4, the group definitions used in representing the logical device and access thereto for node 2 of the production database cluster for its boot device (as initially created in step 2 of FIG. 6) are expanded. In connection with expanding the second BD masking view in step 4, three new paths (HBA3-FA4, HBA4-FA3 and HBA4-FA4) are identified over which a single logical device, node 2 boot disk (SG2), is accessible. Thus, as indicated by 562 of the table 560 from FIG. 8B, node 1's boot disk is assigned LUN0 on each of the foregoing three new paths as a result of automated LUN assignment processing. Based on the expanded group definitions, FIG. 8B also shows the two BD views as defined after completion of step 4. The table 560 of FIG. 8B includes paths and corresponding LUN assignments for the two BD masking views 570 and 572.

Figure 9:
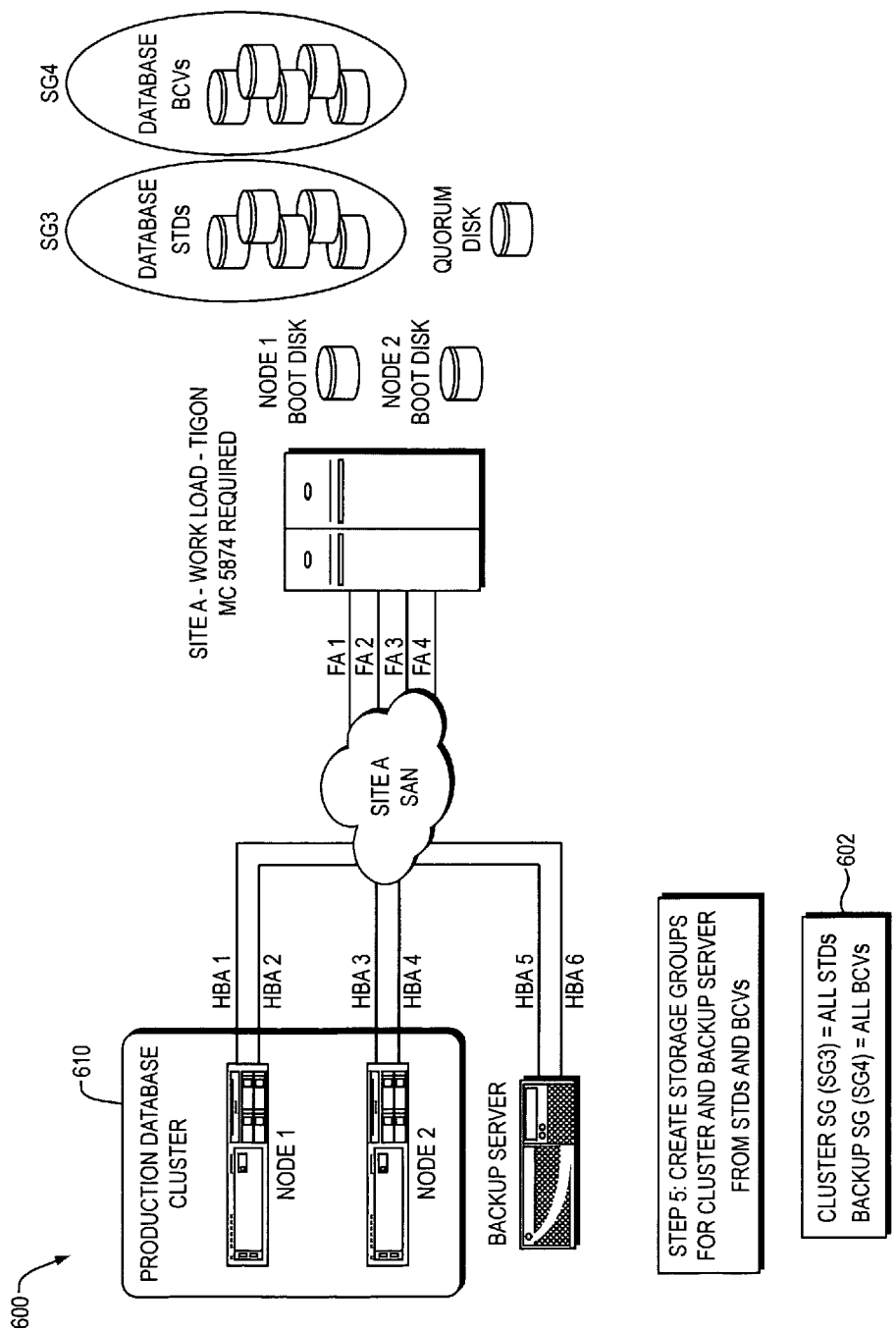

Referring to FIG. 9, illustrated is a fifth processing step in which the SG for the devices used by the database applications on the cluster nodes and the SG for the backup server devices are created. Step 5 includes creating a new cluster SG (SG3) including all database devices (as will be used by the database application instances on node 1 and node 2 of the cluster 610) denoted as database STDs and creating a new backup storage group (SG4) including all devices used by the backup server (denoted database BCVs). The new group definitions created as a result of step 5 are illustrated by element 602 of FIG. 9 and as also illustrated in the system diagram and components of the example 600. As known in the art, data of the BCV devices of SG4 are a backup copy of data from the SG3 devices such as may be obtained through any one of a variety of data replication or duplication techniques.

Figure 10:
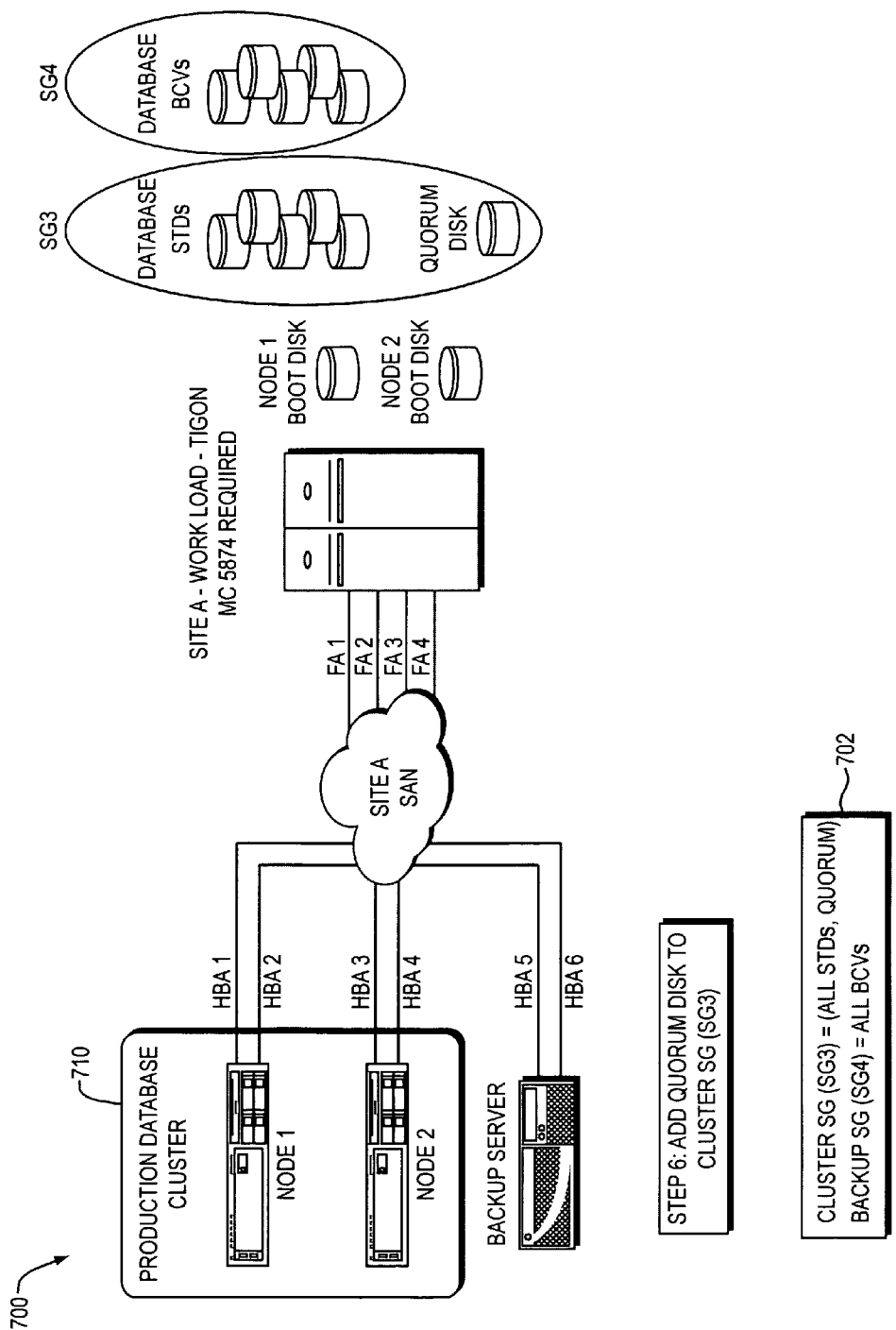

Referring to FIG. 10, illustrated is a sixth processing step in which SG3 created in step 5 is expanded. SG3 is expanded by modifying the group definition for SG3 to include the quorum disk. In this step SG3 is expanded to include an additional device, the quorum disk, which is used by all nodes in the production database cluster 710. The group definitions after performing step 6 are illustrated by element 702 of FIG. 10 and as also illustrated in the system diagram and components of the example 700. It should be noted that since no views have been created which reference SG3, modification of SG3 does not cause modification of a view and also possibly performing automated LUN assignment processing.

Figure 11:
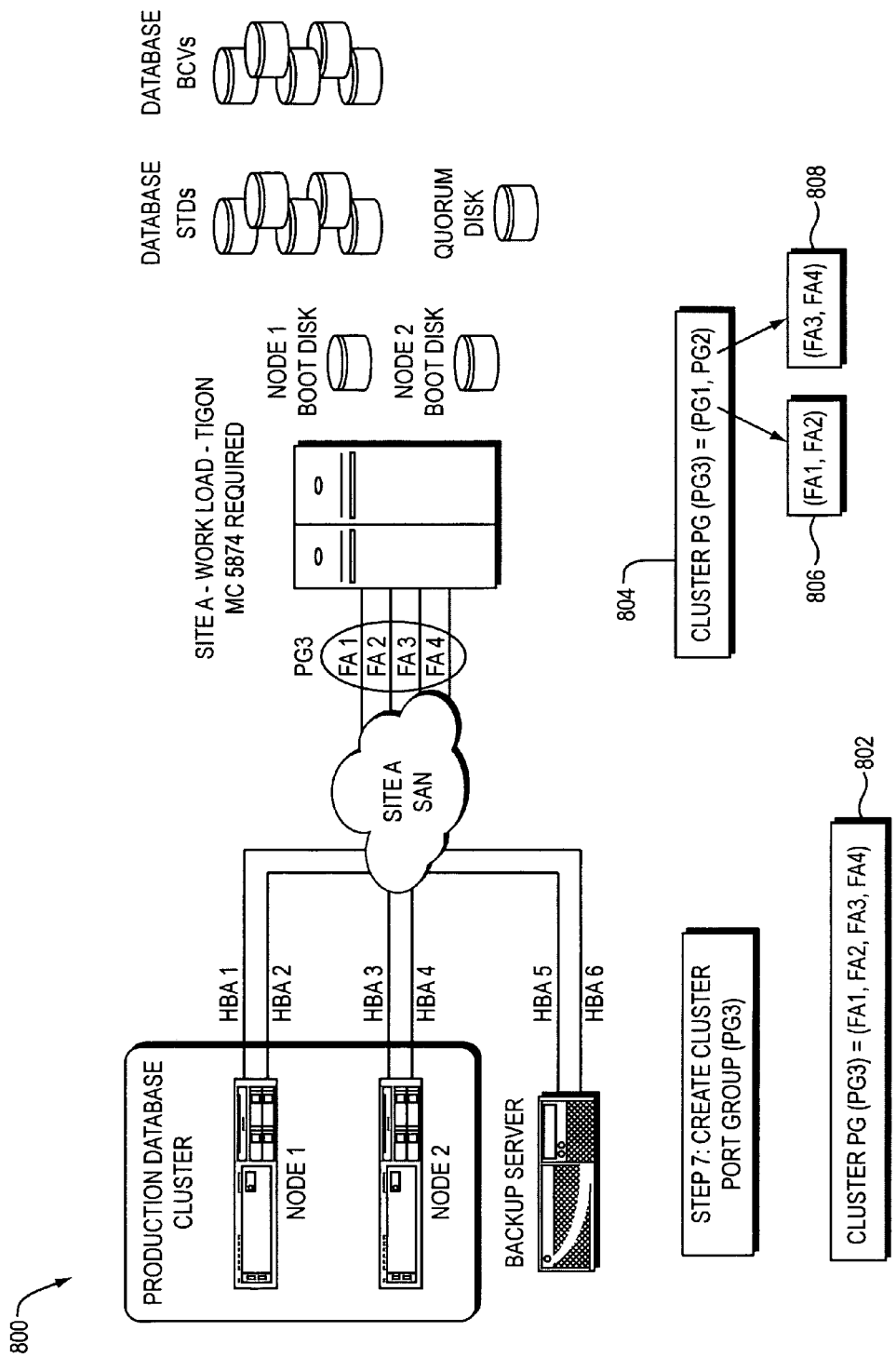

Referring to FIG. 11, illustrated is a seventh processing step in which a cluster target port group (PG3) is created. PG3 is defined to include all FA ports that may be used by cluster nodes 1 and 2 to access the data for the database applications executing thereon. The group definitions created as a result of step 7 are illustrated by element 802 of FIG. 11 and as also illustrated in the system diagram and components of the example 800. Element 802 indicates that PG3 may be defined by selecting each FA port. Element 804 illustrates another way in which an embodiment may allow a group to be defined using a hierarchical group definition structure where a member of a group may also be a group. PG3 may be defined as in 804 as having two members which are existing group definitions PG1 and PG2. The user may enter the group designations for PG1 and PG2 when defining PG3. As a result, code may be executed to perform group resolution processing to determine the target ports of PG3 by determining which target ports are included in each the groups PG1 and PG2 (as illustrated by 806 and 808). The foregoing is an example of a way in which groups may be defined using a hierarchical structure. It should be noted that the foregoing includes only one level group resolution processing and cascading with a group nesting level of 1. However, an embodiment may allow a group nesting level greater than 1 where, for example, a member of PG1 and/or PG2 may be yet another group.

Figure 12:
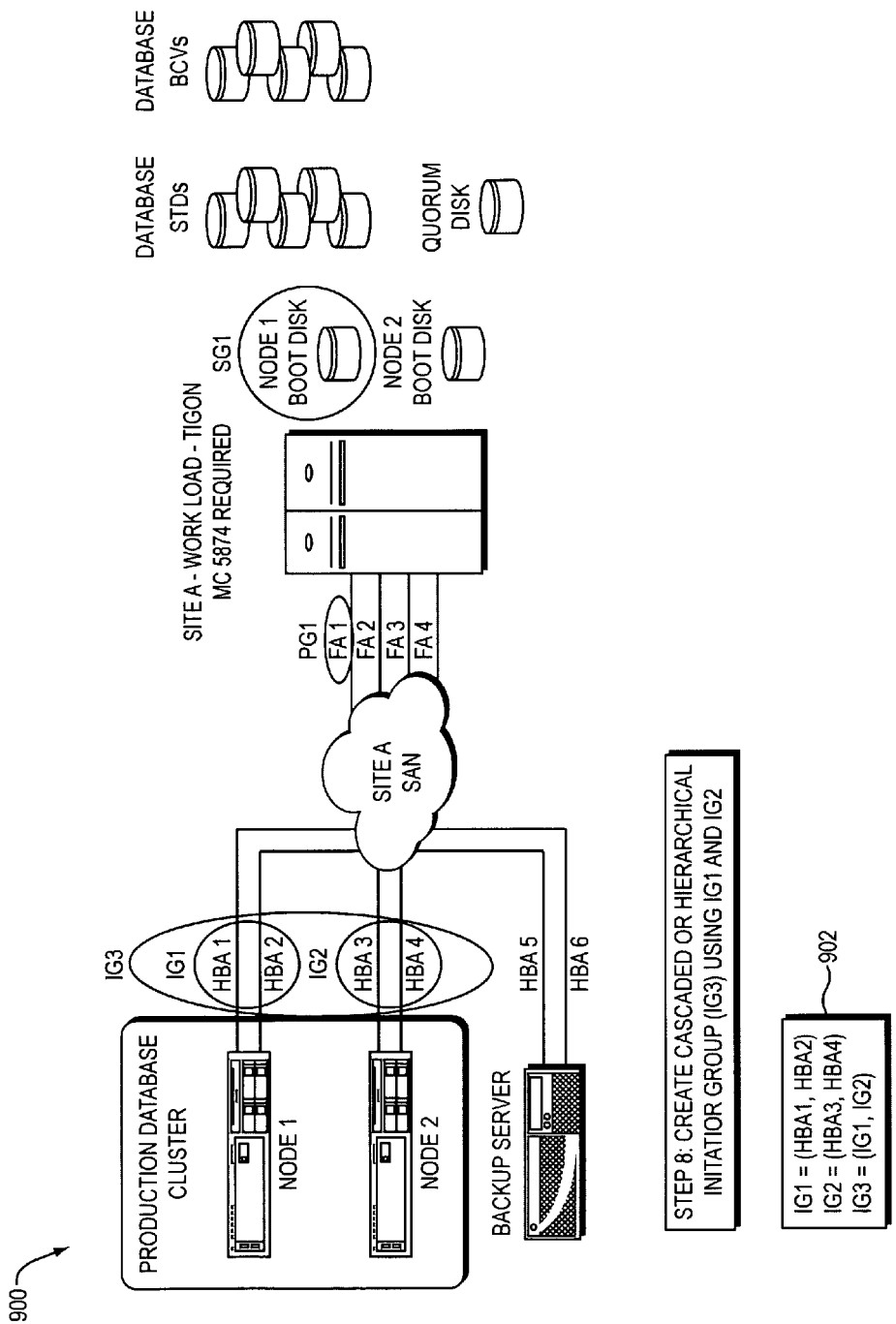

Referring to FIG. 12, illustrated is an eighth processing step in which a cluster initiator port group (IG3) is created. IG3 is defined to include all HBA ports that may be used by cluster nodes 1 and 2 to access the data for the database applications executing thereon. The group definition for IG3 created as a result of step 8 are illustrated by element 902 of FIG. 12 and as also illustrated in the system diagram and components of the example 900. Element 902 indicates that IG3 may be defined using a hierarchical group definition structure where members of IG3 are groups IG1 (as expanded in step 3) and IG2 (as expanded in step 4). The foregoing is similar to that as described and illustrated in connection with elements 804, 806 and 808 of FIG. 11.

It should be noted that although the use of hierarchical group definition structures may be illustrated with respect to particular types of groups having an exemplary nesting level, an embodiment may allow use of hierarchical group definitions with PGs, IGs and SGs. Furthermore, an embodiment may allow any level of nesting.

Figure 13:
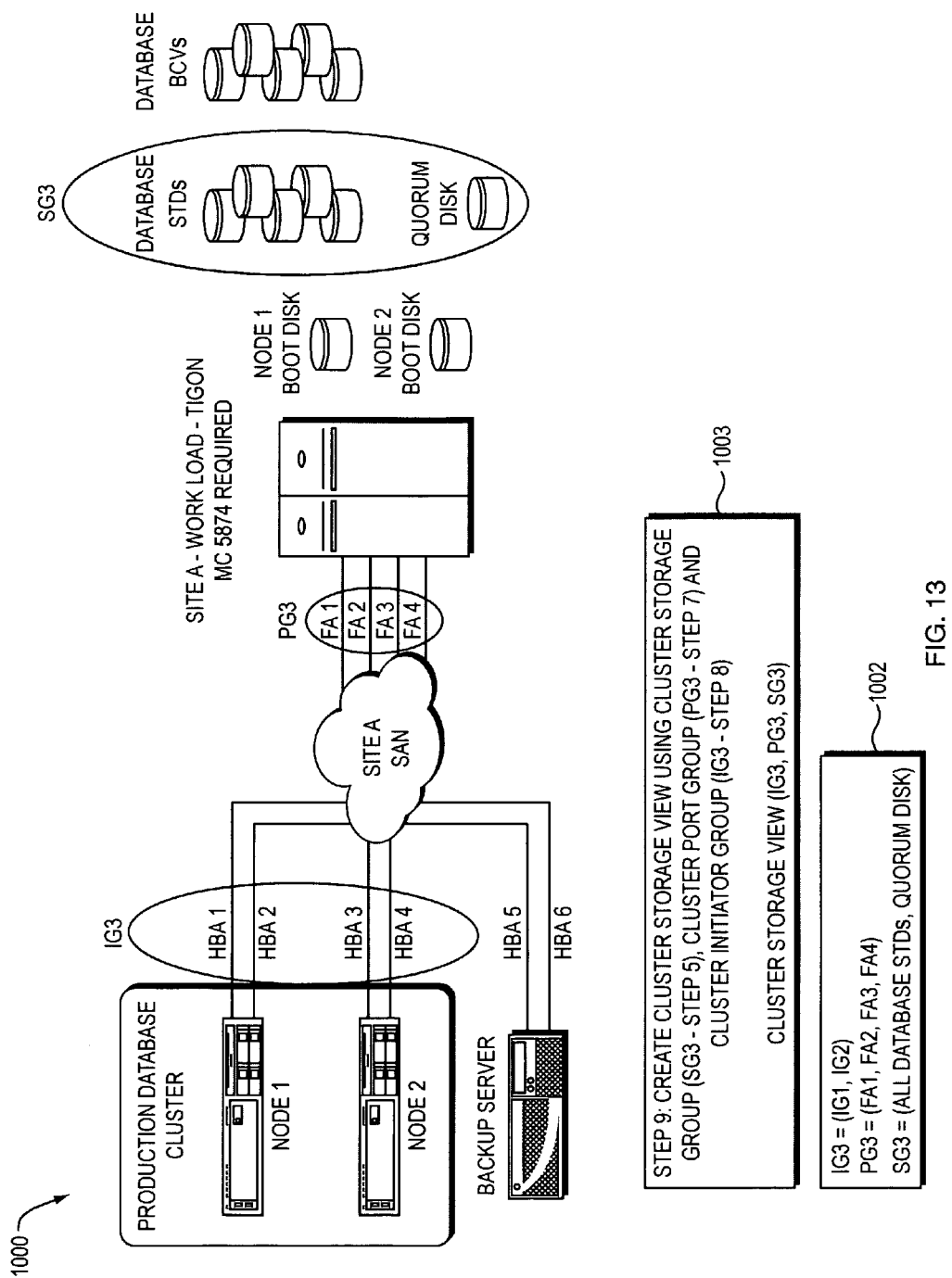

Referring to FIG. 13, illustrated is a ninth processing step in which a cluster storage masking view is created for cluster nodes 1 and 2. The foregoing masking view may be represented by IG3, PG3 and SG3. Based on the existing group definitions of 1002, the cluster storage masking view may then be created as represented in 1003 using the cluster storage group (SG3 created in step 5), the cluster target port group (PG3 as created in step 7) and the cluster initiator port group (IG3 as created in step 8).

Figure 14:
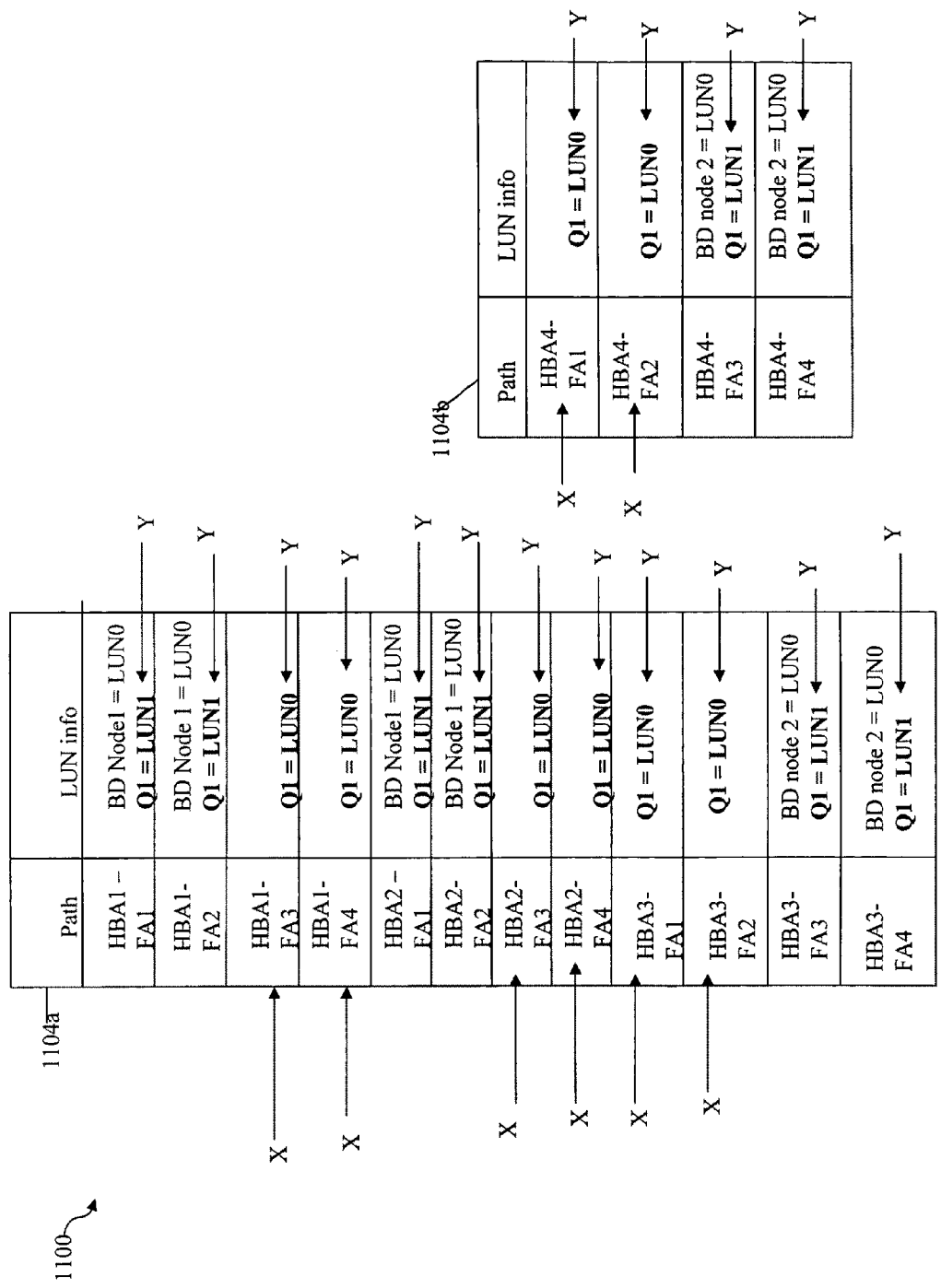

As a result of creating the cluster storage masking view in step 10, the information of table 1104 (represented as including the collective information of 1104a and 1104b) of FIG. 14 may be updated to include new paths and additional LUN assignments for new and/or existing paths in a manner similar to that as described above in connection with other processing steps.

Assume SG3 has only the quorum device, denoted Q1, for simplicity of illustration of automatic LUN assignment for each path for the Q1 disk. The X arrows illustrated in connection with 1104a and 1104b indicate the new paths specified when the view is created in step 9. The Y arrows illustrated in connection with 1104a and 1104b indicate the new LUN assignments made as a result of creating the view of step 9 where the new LUN assignments are both for newly identified paths (denoted by X arrows) and new LUN assignments for existing paths (entries of 1104a and 1104b not having an associated X arrow) specified when the view is created in step 9.

FIG. 14 illustrates a benefit of the automated LUN assignment such as when creating or modifying a view results in identification of additional paths over which devices are accessible and/or results in additional devices being accessible over existing or known paths. As the number of paths increases, so do the benefits of automated LUN assignment.

Figure 15:
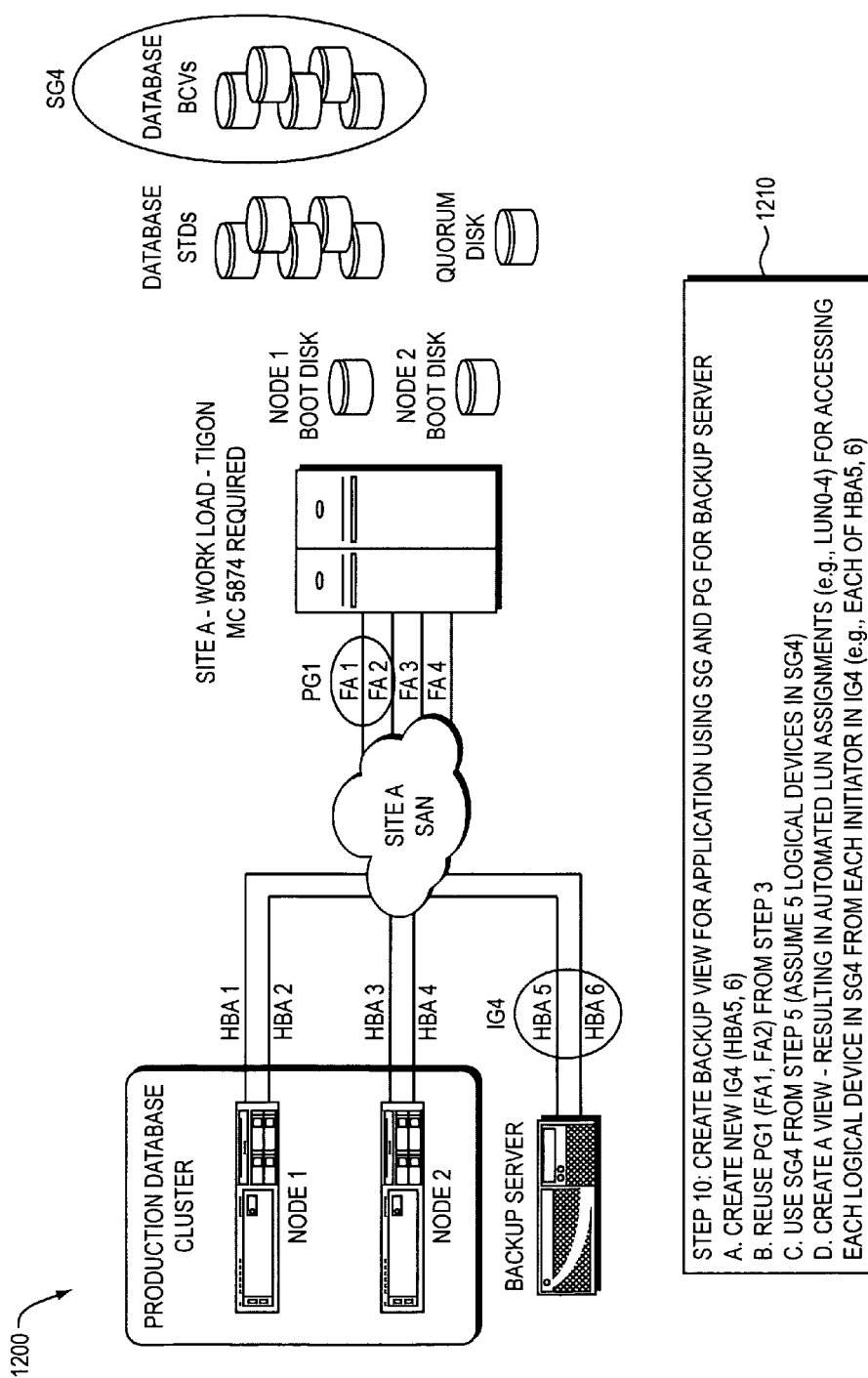

Referring to FIG. 15, illustrated is a tenth processing step in which a backup masking view is created for the backup server. The foregoing backup masking view may be represented by IG4, PG1 and SG4 using existing group definitions for PG1 (see step 10B of 1210) and SG4 (see step 10C of 1210) and where IG4 is newly created as part of step 10 (see step 10A) prior to creating the backup masking view. Prior to creating the view, IG4 is defined to include initiator ports HBA5 and HBA6 of the backup server. As indicated in step 10D of 1210, creating the backup view results in performing any necessary automated LUN assignments.

In this example for purposes of illustration, let SG4 include 5 logical devices. As a result of creating the view of step 10, automated LUN assignments are made for each accessing each logical device in SG4 from each initiator port of IG4 (e.g., each of HBA5 and HBA6). In other words, LUN information is added for each device in SG4 accessible on one of the four possible paths if that device is not currently available on that path. The LUN assignment processing performed in connection with step 10 is as described elsewhere herein.

Referring to FIG. 16, shown is an example 1300 of information added to the path and LUN information table as a result of step 10 processing which creates the backup server masking view. In this example, each device of SG4 is denoted as Bn, n=1-5. Note that if any of the paths of 1300 had previously existed and there had been prior LUN assignments on this path, the LUN assigned to B1 may begin with the next consecutive LUN in the LUN sequence for the path. For example, if path HBA5-FA1 had two prior LUN assignments (e.g., assignment of LUN0 and LUN 1) for two devices other than devices in SG4, the LUNs assigned to B1-B5, would respectively by LUN2-LUN6. As described herein, the LUN assignment and allocation of a next LUN from a LUN sequence for a particular path is performed for a logical device if that device is not already available or accessible via that path (e.g., no existing LUN assignment already specified for a device on an existing path, then add LUN assignment for the device).

In summary with reference to the foregoing processing, LUNs may be assigned as part of automated LUN processing in connection with creating or modifying a masking view such as in connection with steps 1, 2, 3, 4, 9 and 10 above. A view may be modified, for example, by modifying an existing group referenced in a masking view or modifying a masking view by modifying a reference to a group to reference a new or different group. Such LUN assignments may be performed in an automated manner using software which associates a unique LUN assignment sequence for each path and tracks, for each path, which LUN was last assigned to a logical device accessible on that path. Any one or more of the PGs, IGs and SGs may be defined using cascading, nested or hierarchical group definitions where a group member can be another group. The number of permissible nesting levels (group within group references) may be specified or limited for a particular embodiment. Use of hierarchical group definitions allows a first set of group definitions to be preserved for a particular application and then group definitions from the first set may be referenced as members of other groups. A same group may be used in connection with different masking views.

The techniques herein have broad applicability and use other than as illustrated herein. For example, different groups, such as SGs, can be defined based on different QOS (Quality of Service) attributes of the devices such as whether devices are SATA drives, use flash memory, have particular access and/or performance characteristics, and the like. These different SGs may then be further referenced when defining masking views, may be referenced as a member of another group and the like. As another example, IGs can be defined for different types of hosts which may vary with respect to one or more of hardware and/or software thereon. For example, an IG may be defined to include initiator ports of hosts running a particular operating system. A different IG may be defined to include IGs of hosts for each of the different operating systems.

In connection with the techniques herein, the ports included in IGs and/or PGs may be physical or virtual. The ports of IGs may be virtual and associated or defined for a particular virtual machine such as using VM Ware™. An embodiment may then use, for example, the VMotion™ application by VMWare™ to migrate virtual machines from one platform or host to another. At a first point in time, 4 virtual machines (VMs) may be running on a first host. At a second point in time, 2 of the VMs may be migrated to a different second host such as for performance reasons. The VM migration may be performed using an application such as VMotion™ by VMware™. The initiator ports in the IGs may be virtual identifiers which are used by a particular VM. No mapping changes are needed for the initiators in the group. The virtual initiator ports may be remapped for use with different physical initiator ports depending on where the VM is running or is migrated to. In such a case, the IG definition including virtual initiators does not need to be modified. Rather, when a VM is migrated to a different host, the virtual port initiators used by the host may be remapped or bound to different physical initiator ports on the different host without modifying the IG. Virtual ports, also referred to as logical ports, such as may be used for virtual initiator ports or virtual target ports are described, for example, in EMS-262 U.S. patent application Ser. No. 12/317,158, TECHNIQUES FOR PORT VIRTUALIZATION, filed on Dec. 19, 2008, which is incorporated by reference herein, and as described in the N-Port ID Virtualization (NPIV) which is part of a more recent version of the industry standard FC (Fibre Channel) protocol which provides for multiple logical connections over a same physical connection between two physical FC ports.

Although the techniques described herein may be used with logical devices, the techniques herein may also be used with physical devices as well as other data storage units or entities of a data storage system in an embodiment. Additionally, although LUNs and LUN assignment sequences are used in connection with automated LUN assignment, this technique for automated assignment may be more generally characterized as automated logical device identifier assignment where a logical device identifier other than an integer-based logical unit number may be uniquely associated and assigned to a logical device on a particular path to identify that logical device on that path. In a manner similar to that as described herein using LUNs and LUN sequences, it will be appreciated by those skilled in the art that other types of sequences from which logical device identifiers are determined may be used with the techniques herein where a different such sequence is associated with each unique path.

Figure 17:
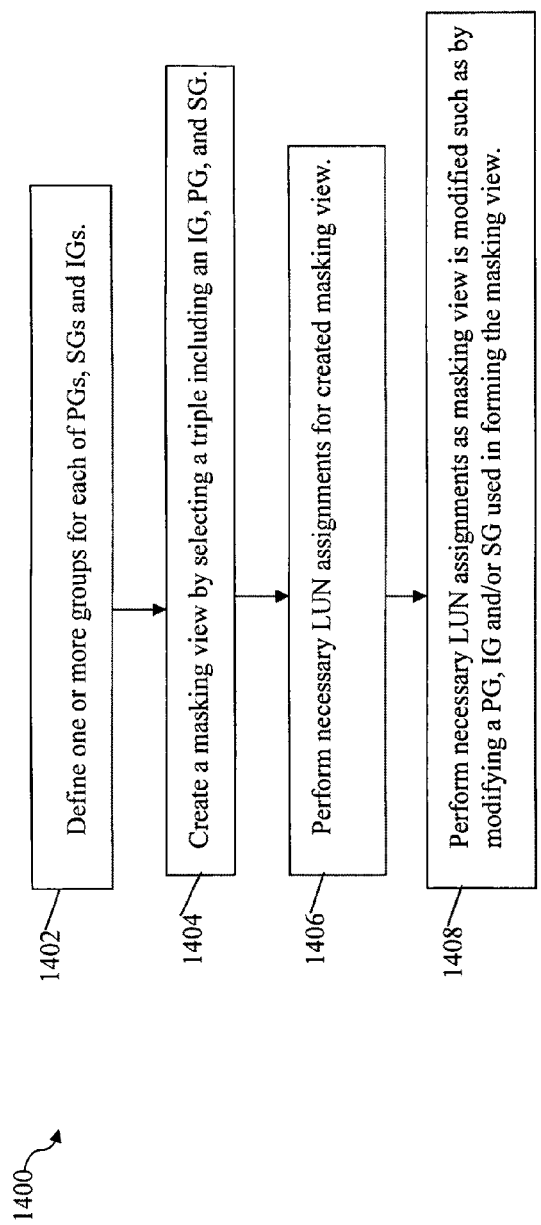
FIGS. 17-18 are flowcharts of processing steps that may be performed in an embodiment in accordance with techniques herein.

Referring to FIG. 17, shown is a flowchart of processing steps that may be performed in an embodiment in accordance with techniques described herein. The flowchart 1400 summarizes processing described above in connection with view creation and view modification processing. In step 1402, one or more groups are defined for each of PGs, IGs and SGs. At step 1404, a masking view is creating using the existing defined groups by selecting a triple including an IG, PG and SG. At step 1406, necessary LUN assignments are made for the created masking view. As described above, such LUN assignments are made on a per unique path (initiator port-target port) basis using a different LUN sequence tracked for each such path. At step 1408, additional LUN assignments may be made as the masking view may be modified. It should be noted that LUN assignments may be removed from the LUN information, for example, if a port is removed from an IG or PG, or if a device is removed from an SG.

Figure 18:
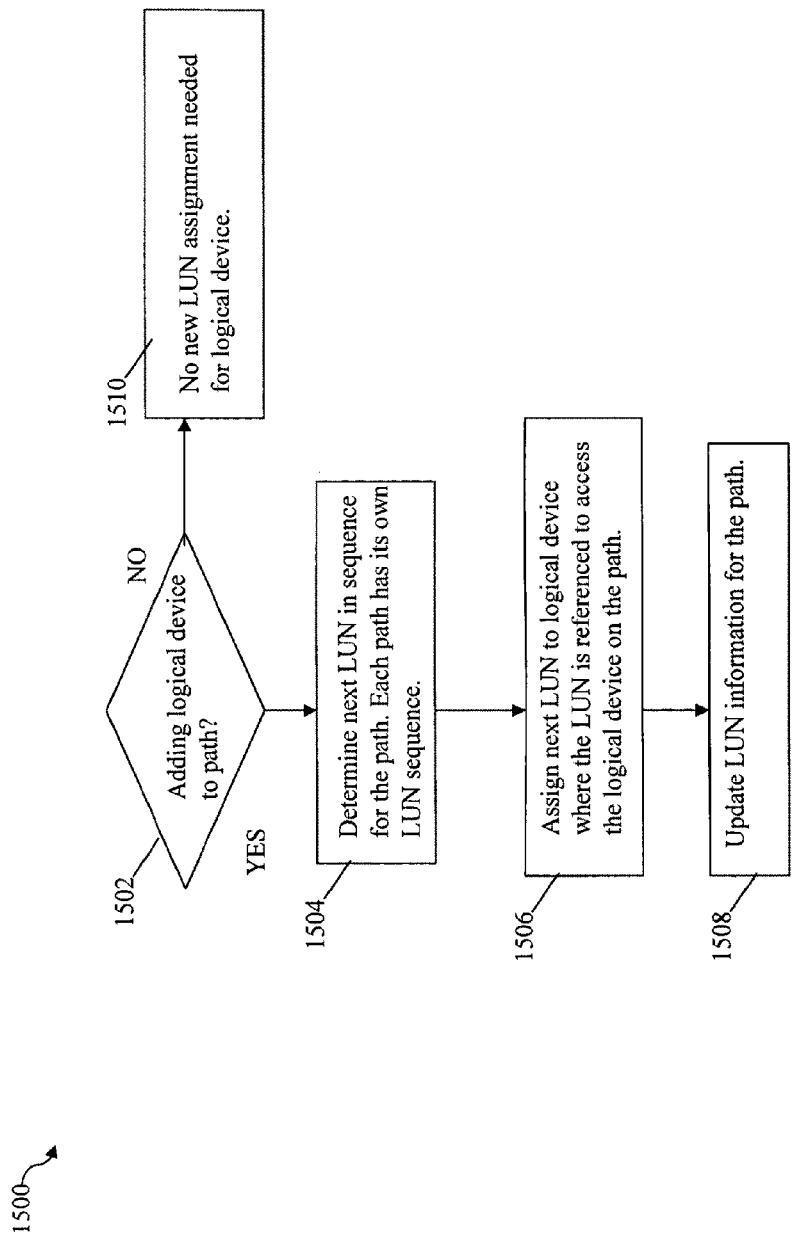

Referring to FIG. 18, shown is a flowchart of processing steps that may be performed in an embodiment in connection with techniques herein for LUN assignment. The flowchart 1500 summarized processing described above. At step 1502, a determination is made as to whether, for a particular path, a logical device is being added as newly accessible or available over that path. If not, control proceeds to step 1510 where no new LUN assignment is needed. If step 1502 evaluates to yes, control proceeds to step 1504 determine the next LUN in the sequence for the path. Each path has its own LUN sequence and a next LUN in a sequence is tracked for each path. At step 1506, the next LUN is assigned to the logical device where the LUN is referenced to access the logical device on the path. At step 1508, the LUN information for the path may be updated such as, for example, to record the logical device-LUN association in the table as may be stored on the data storage system described above.

In connection with the techniques described herein, an embodiment may provide for an in band SCSI notification method to notify the host that a masking view change has occurred. An example of when such a notification may be sent to the host by the data storage system is as follows. A change may be made to a masking view change where the revised masking view references a target port of the data storage system. After the foregoing masking view change, the host may send a command directed to the target port referenced in the changed masking view. In response, the data storage system may fail the command and accordingly send a notification (utilizing the SCSI transport) regarding masking view change and failed command to the host. The host may then take an appropriate action such as, for example, reperform discovery processing, poll the data storage system for masking view changes, and the like. The data storage system may track when the host has taken such an action in order to track when to notify the host regarding further masking view updates.

An embodiment in connection with the techniques herein may also incorporate additional features for use with the techniques herein when bootstrapping (e.g., starting or using for the first time) a data storage system. When a user gets a storage system, such as an array, there are initially no masking views and therefore no visible devices. The customer cannot manage the array in band (using SCSI-based commands) because there are no visible LUNs to which such commands may be directed. One solution to this is to ship the data storage system with a default setting or default masking view, for example, with wild-carded groups allowing any initiator see any device on any target port. When the first masking view is created by the user, the foregoing wild-carded groups may be removed. It should be noted that an embodiment in accordance with techniques herein may ship a data storage system set to any set of default conditions in connection with a default view. For example, an embodiment may allow any initiator port to communicate using any path connected to any target port (e.g., default masking view includes all initiator ports and all target ports). The default may also allow access to only a portion of all devices, such as the first "n" devices using any of the foregoing paths.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for storage configuration comprising:
    defining one or more initiator groups each including one or more initiator ports;
    defining one or more target groups each including one or more target ports;
    defining one or more storage groups each including one or more devices; and
    creating a masking view including a first initiator group from said one or more initiator groups, a first target group from said one or more target groups, and a first storage group from said one or more storage groups, said masking view indicating which devices of said first storage group are accessible using one or more paths, each of said one or more paths specified using an initiator port from said first initiator group and a target port from said first target group,
    wherein automated logical unit assignment is performed for each device included in said first storage group, a different logical unit sequence being associated with each different path over which devices are accessible so that if a same logical device is accessible on two different paths, said same logical device is assigned a first logical unit identifier on a first of said two different paths in accordance with a next identifier of a first identifier sequence for the first path and a second logical unit identifier on a second of said two different paths in accordance with a next identifier of a second identifier sequence for the second path.

2. The method of claim 1, wherein said initiator ports are included in a host.

3. The method of claim 2, wherein said target ports are included in a data storage system including a default masking view and said masking view is a first masking view defined when bootstrapping the data storage system, and, wherein, in response to said creating, said default masking view is deleted, and the method further comprising:
    updating the masking view;
    receiving a command from the host directed to a target port of the masking view; and
    in response to said receiving and said updating, the data storage system fails the command and notifies said host of the command failure and that there has been a change to the masking view.

4. The method of claim 1, wherein said devices include one or more logical devices of the data storage system.

5. The method of claim 1, further comprising performing automated logical unit assignment for each device of said first storage group where said each device is added as a device accessible over a selected path included in said one or more paths associated with said masking view, said device being added if said device is not already specified as a device accessible over the selected path prior to creating said masking view, each device that is added for the selected path being assigned a next logical unit identifier in a sequence uniquely associated with the selected path.

6. The method of claim 5, wherein a different logical unit assignment sequence is associated with each path included in said one or more paths.

7. The method of claim 1, wherein at least one of said first initiator group, said first target group and said first storage group have at least one member which is another group.

8. The method of claim 7, wherein at least one of said first initiator group, said first target group and said first storage group are specified using a hierarchical structure group definition, said hierarchical structure group definition including at least member which is a group.

9. The method of claim 5, further comprising:
    modifying said masking view by modifying at least one of said first initiator group, said first port group, and said first storage group; and
    automatically performing said automated logical unit assignment for each device of said first storage group where said each device is added as a device accessible over a selected path included in said one or more paths associated with said masking view, said device being added if said device is not already specified as a device accessible over the selected path prior to performing said modifying of said masking view.

10. The method of claim 1, wherein at least one port included in said first initiator group or said first target group is a virtual port.

11. The method of claim 1, wherein said first storage group includes devices used by a first application and said one or more storage groups includes a second storage group comprising devices used by a second application.

12. The method of claim 1, wherein said first storage group includes devices having a first set of one or more attributes common to devices of the first storage group, and said one or more storage groups includes a second storage group comprising devices having a second set of one or more attributes common to devices of the second storage group.

13. The method of claim 1, wherein said one or more devices are logical devices of a data storage system.

14. The method of claim 1, further comprising creating a second masking view different from said masking view, said second masking view being defined using at least one of said first initiator group, said first target group and said first storage group.

15. A computer readable non-transitory storage medium comprising executable code stored thereon which, when executed, perform processing for storage configuration, the computer readable medium comprising executable code for:
    defining one or more initiator groups each including one or more initiator ports;
    defining one or more target groups each including one or more target ports;
    defining one or more storage groups each including one or more devices; and
    creating a masking view including a first initiator group from said one or more initiator groups, a first target group from said one or more target groups, and a first storage group from said one or more storage groups, said masking view indicating which devices of said first storage group are accessible using one or more paths, each of said one or more paths specified using an initiator port from said first initiator group and a target port from said first target group,
    wherein automated logical unit assignment is performed for each device included in said first storage group, a different logical unit sequence being associated with each different path over which devices are accessible so that if a same logical device is accessible on two different paths, said same logical device is assigned a first logical unit identifier on a first of said two different paths in accordance with a next identifier of a first identifier sequence for the first path and a second logical unit identifier on a second of said two different paths in accordance with a next identifier of a second identifier sequence for the second path.

16. The computer readable non-transitory storage medium of claim 15, wherein said initiator ports are included in a host, said target ports are included in a data storage system, and said devices include one or more logical devices of the data storage system.

17. The computer readable non-transitory storage medium of claim 15 further comprising executable code for performing automated logical unit assignment for each device of said first storage group where said each device is added as a device accessible over a selected path included in said one or more paths associated with said masking view, said device being added if said device is not already specified as a device accessible over the selected path prior to creating said masking view, each device that is added for the selected path being assigned a next logical unit identifier in a sequence uniquely associated with the selected path, and wherein a different logical unit assignment sequence is associated with each path included in said one or more paths.

18. The computer readable non-transitory storage medium of claim 15, wherein at least one of said first initiator group, said first target group and said first storage group have at least one member which is another group, said at least one of said groups having a hierarchical structure group definition.

19. A system comprising:
    a data storage system including one or more initiator ports and one or more storage devices;
    a host including one or more target ports; and
    a computer readable non-transitory storage medium comprising executable code stored thereon which, when executed, perform processing for storage configuration, the computer readable non-transitory storage medium comprising executable code for:
    defining one or more initiator groups each including at least one of said one or more initiator ports;
    defining one or more target groups each including at least one of said one or more target ports;
    defining one or more storage groups each including at least one of said one or more devices; and
    creating a masking view including a first initiator group from said one or more initiator groups, a first target group from said one or more target groups, and a first storage group from said one or more storage groups, said masking view indicating which devices of said first storage group are accessible using one or more paths, each of said one or more paths specified using an initiator port from said first initiator group and a target port from said first target group,
    wherein automated logical unit assignment is performed for each device included in said first storage group, a different logical unit sequence being associated with each different path over which devices are accessible so that if a same logical device is accessible on two different paths, said same logical device is assigned a first logical unit identifier on a first of said two different paths in accordance with a next identifier of a first identifier sequence for the first path and a second logical unit identifier on a second of said two different paths in accordance with a next identifier of a second identifier sequence for the second path.

* * * * *